United States Patent
Shiraishi et al.

[11] Patent Number: 5,936,944
[45] Date of Patent: Aug. 10, 1999

[54] NETWORK SYSTEM

[75] Inventors: Yasuto Shiraishi; Tomoyuki Hamada, both of Osaka; Junichi Katoh, Kawasaki, all of Japan

[73] Assignee: Fujitsu Limited, Kanagawa, Japan

[21] Appl. No.: 09/048,882

[22] Filed: Mar. 26, 1998

[30]    Foreign Application Priority Data

Oct. 20, 1997  [JP]  Japan .................................. 9-287477

[51] Int. Cl.⁶ ...................................................... H04Q 1/30
[52] U.S. Cl. ............................................ 370/244; 370/410
[58] Field of Search .................................. 370/389, 395, 370/396, 397, 400, 401, 419, 420, 421, 384, 385, 242, 244, 462, 410, 522

[56]              References Cited

U.S. PATENT DOCUMENTS

| | | | |
|---|---|---|---|
| 5,418,847 | 5/1995 | Murata .................................... | 370/438 |
| 5,436,889 | 7/1995 | Matsumoto et al. .................... | 370/385 |
| 5,452,293 | 9/1995 | Wilkinson et al. ..................... | 370/410 |
| 5,519,699 | 5/1996 | Ohsawa .................................. | 370/410 |

*Primary Examiner*—Chau Nguyen
*Assistant Examiner*—Kenneth Vanderpuye
*Attorney, Agent, or Firm*—Helfgott & Karas, P.C.

[57]               ABSTRACT

In a network system according to the present invention, in the case where a plurality of calls are set between specific terminal and the other terminal unit to conduct communication, when a communication fault is detected in a frame relay network, a representative call is decided from the plurality of calls, and all the calls except for the representative call are released. Thereafter, a call cut message including information relating to the calls to be released is transmitted from the frame relay network. In the specific terminal, the calls except for the representative call are released on the basis of the information of the calls to be released which is contained in the call cut message to transmit the call release message of the representative call. In the frame relay network, the representative call is released according to the call release message to transmit the call release completion message. Then, in the specific terminal, the representative call is released.

12 Claims, 25 Drawing Sheets

NETWORK SYSTEM

BACKGROUND OF THE INVENTION

1. Field of the Invention

The present invention relates to a network system, and more particularly to SVC (switched virtual circuit: counterpart switched connection) control of ITU-T advice Q.933 or a frame relay exchange complying with a frame relay forum which constitute the network system.

2. Description of the Related Art

In the ITU-T advice Q.933 and the frame relay forum, specific messages are used in the SVC, and a restart (initializing) procedure of cutting a plurality of calls which are currently set or all of calls at once is not defined.

For that reason, in the case where communication is conducted between a plurality of frame relay terminal units (hereinafter referred to as "terminal units") through a frame relay network, when there occurs a fault of a node (a connecting point of a network, for example, a frame relay exchange, etc.), a fault of a terminal unit, a fault of a trunk line that connects between the respective nodes or between the node and the terminal unit, etc., a plurality of calls must be cut. In this case, a process of cutting the respective calls is conducted in accordance with the cutting procedure (normal cutting sequence) defined by ITU-T advice Q.933.

The normal cutting sequence will be now described. For example, in the case where a call is cut between the terminal unit and the frame relay exchange, for example, the frame relay exchange transmits a message "DISC (cut)" to the terminal unit. Upon receiving "DISC" from the frame relay exchange, the terminal unit releases a call between the terminal unit and the frame relay exchange to transmit a message "REL (release)" to the frame relay exchange. Upon receiving "REL" from the other terminal unit, the frame relay exchange releases a call between the frame relay exchange and the terminal unit to transmit a message "REL COMP (release completion)" to the other terminal unit. In this way, the call set between the frame relay exchange and the terminal unit is cut.

However, in the case where a plurality of calls are cut using the normal cutting sequence, there arises a problem stated below. FIG. 25 is an explanatory diagram for explanation of a conventional problem. In the case where communication is conducted under the condition where a plurality of calls (four in FIG. 25) are set between a terminal unit X and a terminal unit Y through a frame relay network as shown in FIG. 25, it is assumed that a fault occurs within the frame relay network. Then, a cutting process is conducted in the frame relay network in accordance with the above-mentioned normal cutting sequence.

In other words, a message "DISC" is transmitted from the frame relay network to the respective terminal units X and Y for every call. Upon receiving the respective messages "DISCs", the respective terminal units X and Y transmit "RELs" corresponding to the respective terminal units X and Y to the frame relay network. Then, the frame relay network receives the respective "RELs" transmitted from the respective terminal units X and Y and transmit "REL COMPs", and transmits the respective "REL COMPs" corresponding to those "RELs" to the respective terminal units X and Y substantially at the same time. Thereafter, upon the reception of the respective "REL COMPs" by the respective terminal units X and Y, all the calls set between the terminal units X and Y are cut.

In the above way, in the normal cutting sequence, the respective messages of "DISC", "REL" and "REL COMP" are exchanged per set call. In other words, in the example shown in FIG. 25, the respective four message exchanges of "DISC", "REL" and "REL COMP" are made between the respective terminal units X, Y and the frame relay network. As a result, during conducting the above-mentioned cutting sequence, a line connecting the terminal unit X and the frame relay network, and a line connecting the terminal unit Y and the frame relay network remarkably rise in load.

For that reason, there was a case in which congestion is generated by execution of the above-mentioned cutting sequence to lower a through-put, resulting in a state where a communication response between the respective terminal units gets remarkably deteriorated.

SUMMARY OF THE INVENTION

The present invention has been made to solve the above-mentioned problem, and therefore an object of the present invention is to provide a network system which is capable of conducting a process of cutting a plurality of calls without deteriorating a communication response.

In order to achieve the above object, according to a first aspect of the present invention, there is provided a network system in which a plurality of terminals are connected to a network. The network comprises a call setting request unit transmitting a call setting request message to a specific terminal among the plurality of terminals, a information adding unit adding procedure information relating to a restart procedure executable between the network and the specific terminal to the call setting request message, a extracting unit extracting specific information relating to the restart procedure contained a response message received from the specific terminal, a first procedure setting unit setting a restart procedure corresponding to the specific information extracted by the extracting unit to be executable between the network and the specific terminal. The specific terminal comprises a receiving unit receiving the call setting request message transmitted from the network, a information obtaining unit obtaining the procedure information contained in the call setting request message received by the receiving unit, a information holding unit holding information relating to a plurality of restart procedures executable between the specific terminal and the network, a information producing unit producing the specific information relating to the restart procedure executable between the specific terminal and the network on the basis of the information held by the information holding unit and the information obtained by the information obtaining unit, a response unit transmitting the response message in which the specific information produced by the information producing unit is contained to the network, and a second procedure setting unit setting the restart procedure corresponding to the specific information produced by the information producing unit to be executable between the specific terminal and the network.

According to the first aspect of the present invention, in the case of transmitting the call setting request message to specific terminal, the network adds the procedure information to the call setting request message. The specific terminal knows the restart procedure executable between the specific terminal and the network on the basis of the procedure information. Then, the specific terminal sets the restart procedure executable between the specific terminal and the network into an executable state in accordance with the procedure information. Thereafter, the network sets the restart procedure executable between the network and the specific terminal into an executable state in accordance with the specific information contained the response message.

With this structure, the restart procedure between the network and the specific terminal can be automatically set.

In the first aspect of the present invention, it is preferably structured that the information adding unit of the network only add the procedure information to the call setting request message, when the call setting request unit first transitting the call setting request message to the specific terminal.

According to a second aspect of the present invention, there is provided a network system in which a plurality of terminal units are connected to a frame relay network. The network comprises a fault detecting unit detecting, when a plurality of calls for communication are set between one terminal and the other terminal among the plurality of terminals via the network, a fault in the communication, a representative call deciding unit deciding any one of the plurality of calls as a representative call, when the fault detecting unit detecting the fault of the communication, a first releasing unit releasing the plurality of calls set between the one termnal and the other terminal except for the representative call, a call cut message transmitting unit producing a call cut message for releasing the representative call and transmitting the call cut message to the one terminal, a call information adding unit adding call information about calls to be released to the call cut message and a second releasing unit releasing the representative call set between the one terminal and the network and transmitting a call release completion message corresponding to the call release message to the one terminal in the case of receiving a call release message corresponding to the call cut message from the one terminal. The one terminal comprises a third releasing unit releasing the plurality of calls set between the one terminal and the network except for the representative call on the basis of the call information contained in the call cut message received from the network, a call release message transmitting unit producing the call release message and transmitting the call release message to the network, and a fourth releasing unit releasing the representative call set between the one terminal and the network in the case of receiving the call release completion message.

According to the second aspect of the present invention, upon the detection of a communication fault by the network, the representative call is decided from the plurality of calls, and the calls except for the representative call is released. Subsequently, the call cut message containing the call information relating to the calls to be released is transmitted to the one termial. In the one terminal, the calls except for the representative call are released on the basis of the call information and the call release message is transmitted to the network. In the network, the representative call is released in accordance with the call release message and transmitted the call release completion message. Then, in the one terminal, the representative call is released. In this way, in the case of cutting the plurality of calls, the representative call is decided, the calls except for the representative call are released, and thereafter the representative call is released. Therefore, the call cut procedure may not be executed every call unlike the conventional system. As a result, a load on the network can be reduced, thereby being capable of suppressing the deterioration of a communication response.

According to a third aspect of the present invention, there is provided a network system in which a plurality of terminals are connected to a network. The network comprises a fault detecting unit detecting, when a plurality of calls for communication are set between a first terminal, a second terminal and a third terminal among the plurality of terminals via the network, a fault in the communication of the first terminal and the second terminal, a representative call deciding unit deciding any one of the plurality of calls set between the first terminal and the second terminal as a representative call when the fault of the communication between the first terminal and the second terminal is detected by the fault detecting means a first releasing unit releasing the plurality of calls set between the first terminal and the second terminal except for the representative call, a call cut message transmitting unit producing a call cut message for relating the representative call and transmitting the call cut message to the first terminal, a call information adding unit adding call information about calls to be released to the call cut message, and a second releasing unit releasing the representative call set between the first terminal and the network and transmitting a call release completion message corresponding to a call release message to the first terminal in the case of receiving the call release message corresponding to the call cut message from the first terminal. The one terminal comprises a third releasing unit releasing the plurality of calls set between the first terminal and the network except for the representative call on the basis of the call information is contained in the call cut message received from the network, and a call release message transmitting unit producing the call release message and transmitting the call release message to the network, and a fourth releasing unit releasing the representative call in the case of receiving the call release completion message.

According to a fourth aspect of the present invention, there is provided a network system in which a plurality of terminals are connected to a network. The network comprises a fault detecting unit detecting, when a plurality of calls for communication are set between one terminal and the other terminal among the plurality of terminals via the network, a fault in the communication, a representative call deciding unit deciding any one of the plurality of calls as a representative call, when the fault detecting unit detecting the fault of the communication, a first releasing unit releasing the plurality of calls set between the one termnal and the other terminal except for the representative call, a call cut message transmitting unit producing a call cut message for releasing the representative call and transmitting the call cut message to the one terminal, a call information adding unit adding call information about calls to be released to the call cut message, and a second releasing unit releasing the representative call set between the one terminal and the network in the case of receiving a response message corresponding to the call cut message from the one terminal. The one terminal comprises a third releasing unit releasing all of the plurality of calls set between the one terminal and the network on the basis of the call cut message received from the network, and a response message transmitting unit producing the response message and transmitting the response message to the network.

According to a fifth aspect of the present invention, there is provided a network system in which a plurality of terminals are connected to a network. The network comprises a fault detecting unit detecting, when a plurality of calls for communication are set between one terminal and the other terminal among the plurality of terminals via the network, a fault in the communication, a representative call deciding means for deciding any one of a part of the plurality of calls as a representative call, when the fault detecting means detecting the fault of the communication, a first releasing unit releasing the part of the plurality of calls set between the one termnal and the other terminal except for the representative call, a call cut message transmitting unit producing a call cut message for releasing the representative call and transmitting the call cut message to the one terminal a call information adding unit adding call information about calls to be released to the call cut message, and a second releasing unit releasing the representative call set between the one terminal and the network in the case of receiving a response message corresponding to the call cut message from the one terminal. The one terminal comprises third releasing unit releasing all of the part of the plurality of calls set between the one terminal and the network on the basis of the call cut message received from the network, and a response message transmitting unit producing the response message and transmitting the response message to the network.

In the third aspects of the present invention, it is preferable that the call information contains data link connection identification numbers to be released. Alternatively, the call information contains a bit map indicating data link connection identification numbers to be released. Alternatively, the call information contains range of the data link connection identification numbers. to be released.

According to the network system of the present invention, since a plurality of calls set between the network and the terminal can be cut by means of one call cutting procedure, a load on the line and the network can be prevented from increasing due to the execution of the cutting procedure every call. For that reason, a response of data communication between the respective terminals can be prevented from being lowered.

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the present invention with reference to the accompanying drawings.

Structure of Network System

Figure 1:
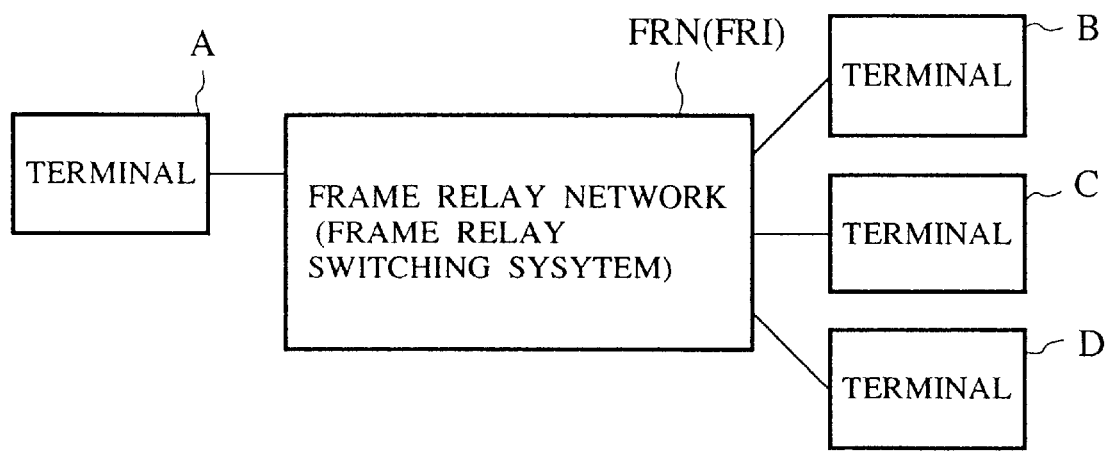
FIG. 1 is a diagram showing an entire structure of a network system according to an embodiment of the present invention.

FIG. 1 is a diagram showing an entire structure of a network system according to an embodiment of the present invention. As shown in FIG. 1, the network system according to this embodiment is structured in such a manner that a plurality of terminal units (terminal units A to D shown in FIG. 1) are connected to a frame relay network FRN through communication lines, respectively.

Frame Relay Network

The frame relay network FRN is made up of a single or a plurality of nodes (frame relay exchange FR1) and a communication line (trunk line) that connects between the respective nodes. In this embodiment, for simplification of description, the frame relay network FRN is made up of a single frame relay exchange FR1.

The frame relay exchange FR1 includes, in a hardware fashion, a line corresponding section for processing a frame as inputted or a frame to be outputted, a CC (channel controller) that controls the line corresponding section, a switch that changes the frame, a memory unit (RAM (random access memory), ROM(read only memory), MO(magneto optical disk), hard disk, etc.) which stores data used for program which is executed by the CC or used in the execution of the program, etc., therein, and so on.

Figure 2:
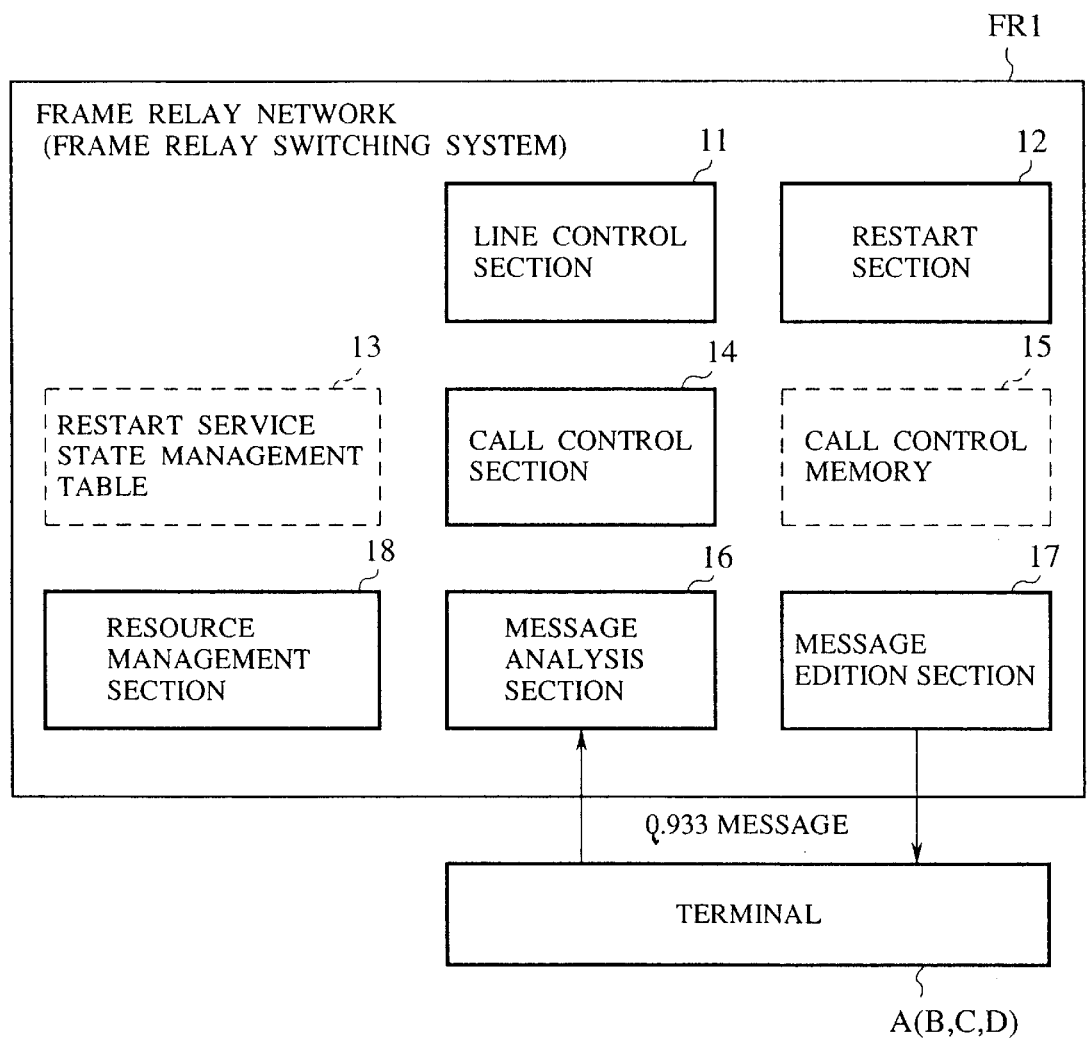
FIG. 2 is a functional block diagram showing a frame relay network (frame relay exchange)

FIG. 2 is a functional block diagram showing the frame relay exchange FR1 with the above-mentioned hardware structure. In FIG. 2, the frame relay exchange FR1 includes a line fault detection section 10, a line control section 11, a restart section 12, a restart service state management table (hereinafter referred to as "restart management table") 13, a call control section 14, a call control memory 15, a message analysis section 16, a message edition section 17, and a resource management section 18.

In this example, the line control section 11 monitors whether physical lines connected between the frame relay exchange FR1 and the respective terminal units A to D are useable, or not, whether a fault occurs in the respective physical lines, or not, or the like.

The restart section 12 specifies a call to be cut in the case of cutting the call set using the frame relay exchange FR1, and gives a request for cutting the specified call to the call control section 14.

Figure 3:
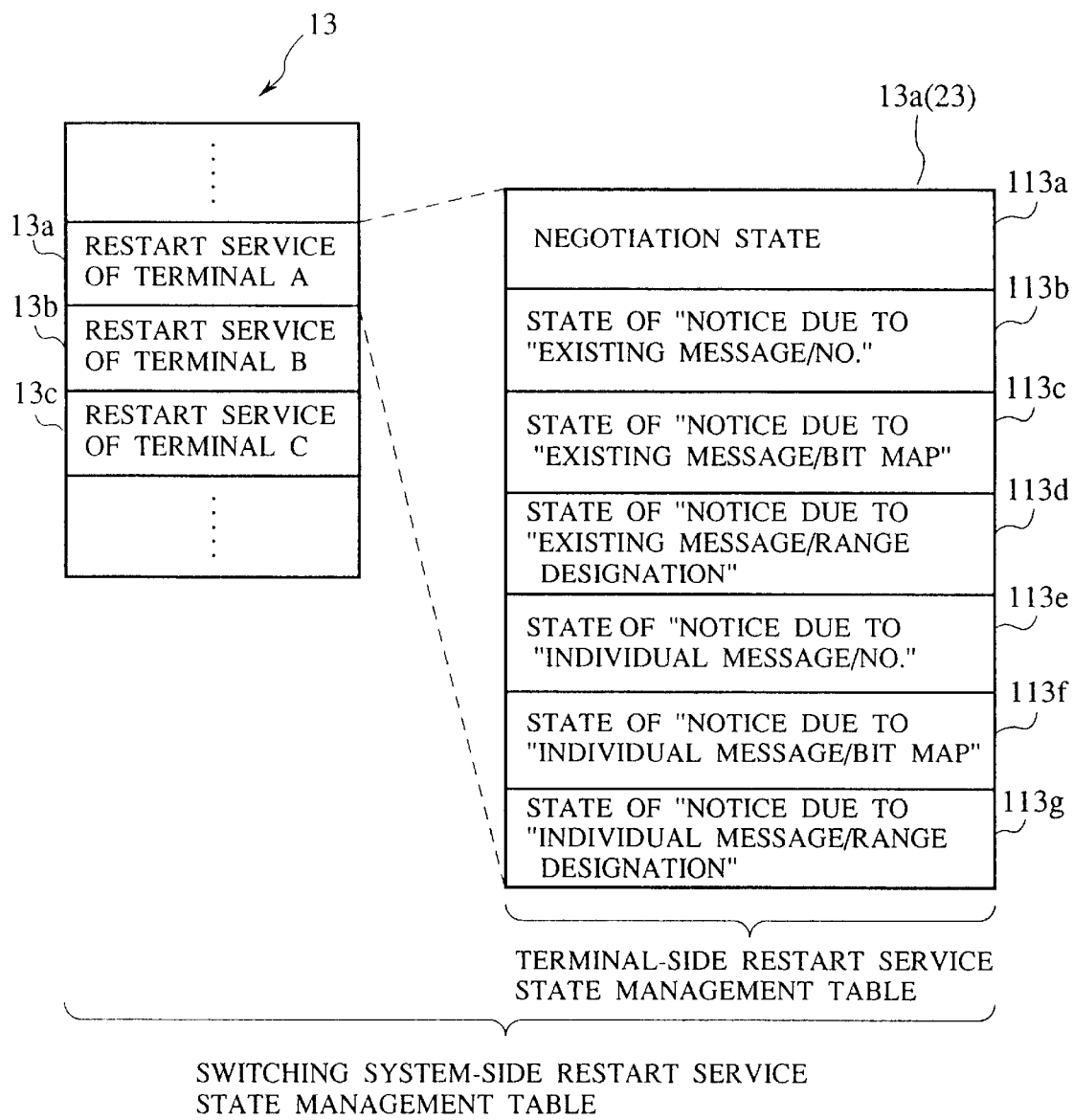
FIG. 3 is an explanatory diagram showing a restart service state management table.

In the restart management table 13, there is stored information relating to which cutting procedure should be used when cutting a plurality of calls in the respective terminal units A to D connected with the frame relay exchange FR1. FIG. 3 is an explanatory diagram showing the restart management table 13. As shown in FIG. 3, in the restart management table 13 are formed a plurality of regions 13a to 13n (only the regions 13a to 13c in FIG. 3) which store therein the contents of a restart service (restart procedure) that is supplied to the respective terminal units A to D.

In each of the regions 13a to 13n, there is formed a region 113a that stores therein a negotiation state representative of whether a negotiation of the restart service to the terminal units (or the frame relay exchanger) has been completed, or not. Specifically, information of "negotiation completion" or "negotiation incompletion" is stored in the region 113.

Also, in each of the regions 13a to 13n are formed a plurality of regions 113b to 113g that store information representative of the supply/non-supply of plural kinds of restart services therein. In this example, in the region 113b is stored information representative of the supply/non-supply of the restart service (hereinafter referred to as "service (1)") due to "notice due to existing message/No.". In the region 113c is stored information representative of the supply/non-supply of the restart service (hereinafter referred to as "service (2)") due to "notice due to existing message/bit map". In the region 113d is stored information representative of the supply/non-supply of the restart service (hereinafter referred to as "service (3)") due to "notice due to existing message/range designation".

Also, in the region 113e is stored information representative of the supply/non-supply of the restart service (hereinafter referred to as "service (4)") due to "notice due to individual message/No". In the region 113f is stored information representative of the supply/non-supply of the restart service (hereinafter referred to as "service (5)") due to "notice due to individual message/bit map". In the region 113g is stored information representative of the supply/non-supply of the restart service (hereinafter referred to as "service (6)") due to "notice due to individual message/range designation".

In more detail, in each of the regions 113b to 113g, any one of "off-line" representative of the non-supply of the restart service, "standby" representing that the restart service is being negotiated, and "on-line" representative of the supply of the restart service is set. The contents stored in the restart management table 13 is referred to by the restart section 12 or the message edition section 17 and rewritten.

The call control section 14 shown in FIG. 2 manages the call set between the respective terminal units A to D, and also controls the operation of the frame relay exchange FR1 in setting the call or cutting the call.

Figure 4:
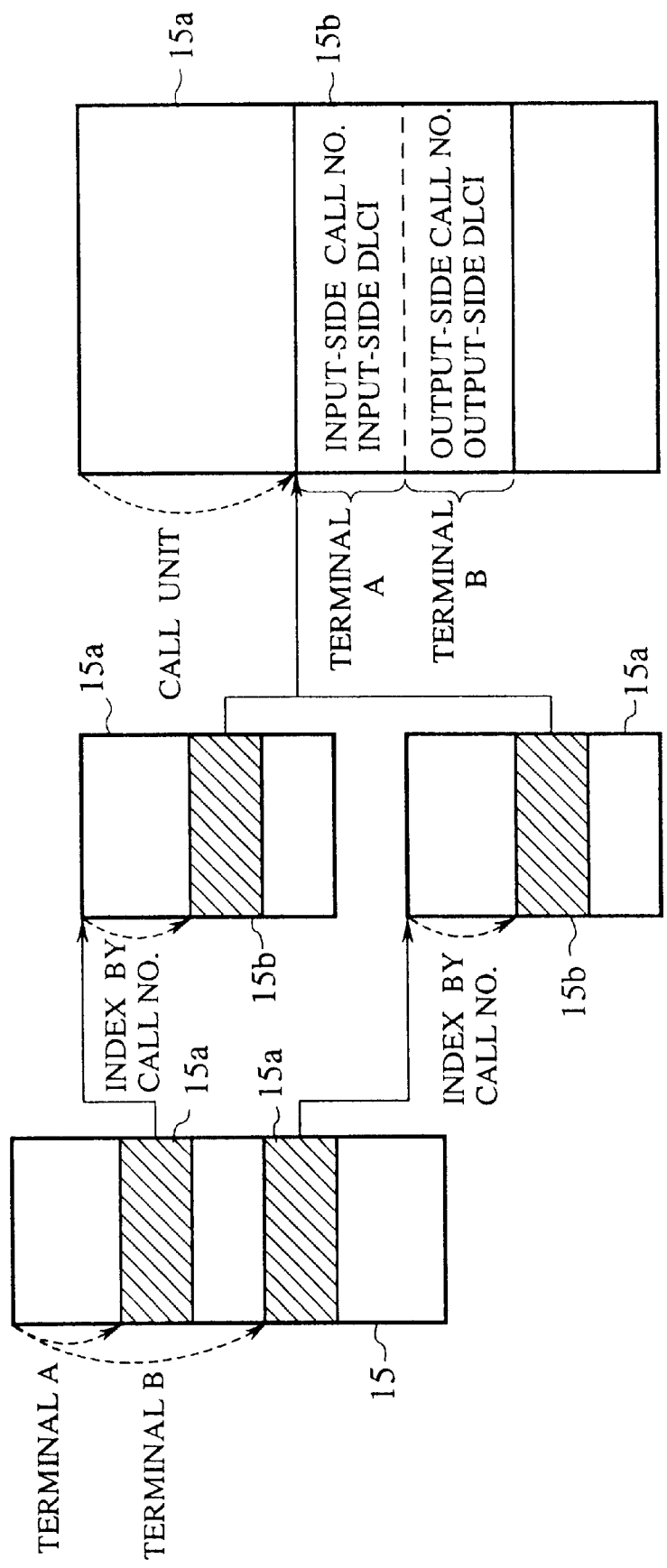
FIG. 4 is an explanatory diagram showing a call control memory.

In the call control memory 15 is stored information relating to the calls set at the present time. FIG. 4 is an explanatory diagram showing the call control memory 15. In the call control memory 15 is formed a plurality of first regions 15a set in correspondence with the terminal units. Each of the first regions 15a is made up of a plurality of second regions 15b formed in correspondence with call Nos. In each of the second regions are stored an input-side (transmitting-side terminal unit) call No. and an input-side DLCI (data link connection identifier) as well as an output-side (receive-side terminal unit) call No. and an output-side DLCI. The contents stored in the call control memory 15 is referred to by the call control section 14 and the resource management section 18 and rewritten.

The message analysis section 16 analyzes the contents of the message received by the frame relay exchange FR1 from the respective terminal units A to D. Also, the message analysis section 16 notifies the call control section 14 of the analysis result of the message.

The message edition section 17 produces a message in accordance with an instruction from the call control section 14. The message produced by the message edition section 17 is transmitted toward any one of the terminal units A to D.

The resource management section 18 alters the storage contents of the call control memory 15 in accordance with the instruction from call control section 14. Further, the above-mentioned frame relay exchange FR1 provides an SVC function that selectively connects any two of the terminal units A to D. Also, a memory unit not shown within the frame relay exchange FR1 stores therein information (specific information) representative of a sort of a restart service providable by itself.

Terminal Unit

Each of the terminal units A to D shown in FIG. 1 is a computer (for example, a personal computer, a work station, a server unit, etc.) having a CPU, a memory unit, an output unit, an input unit, a communication interface, etc. Since the terminal units A to C among the terminal units A to D have the same structure, the terminal unit A will be described as an example.

FIG. 3 is a functional block diagram showing the terminal unit A. In FIG. 3, the terminal unit A includes a line control unit 21, a restart section 22, a restart management table 23, a call control section 24, a call control memory 25, a message edition section 26, a message analysis section 27 and a resource management section 28.

Then, the message edition section 26 receives a message transmitted from the frame relay exchange FR1, and the message edition section 27 transmits the message toward the frame relay exchange FR1. Because the structural elements of the terminal unit A shown in FIG. 3 are identical with the structural elements of the frame relay exchange FR1 shown in FIG. 2, the description of the respective structural elements of the terminal unit A will be omitted.

Figure 6A:
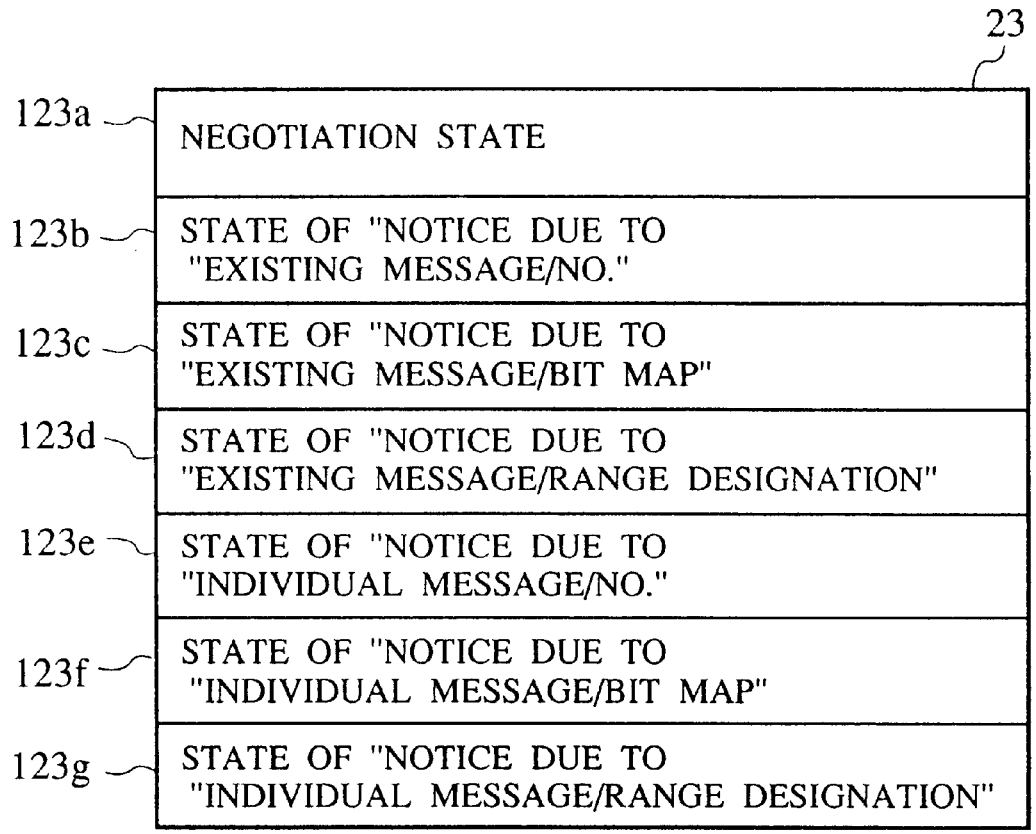
FIGS. 6A and 6B are explanatory diagrams showing the restart service state management table and the call control memory, respectively.
Figure 6B:
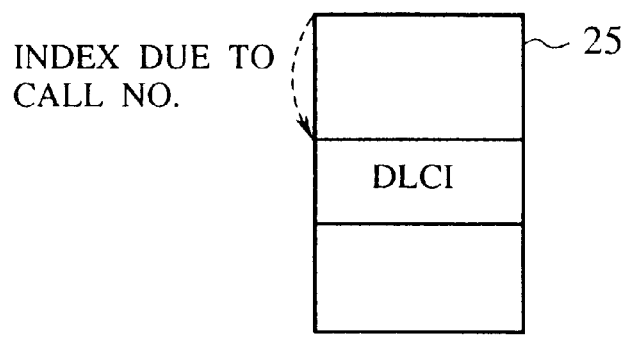

The restart management table 23 has the same structure as the region 13a shown in FIG. 3, as shown in FIG. 6A, in such a manner that a region 123a stores a negotiation state to the frame relay exchange FR1 therein, and the respective regions 123b to 123g store therein information representative of the contents of the restart service provided by the terminal unit A, as in the respective regions 113b to 113g. Also, the call control memory 25 stores therein a DLCI No. corresponding to a set call as shown in FIG. 6B.

Also, a memory unit not shown in each of the terminal units A to C stores therein information (specific information) representative of a sort of the restart service providable by the terminal unit per se. The terminal unit D is a terminal unit that cannot provide any one of the above-mentioned services (1) to (6). That is, it is a conventional terminal unit.

Processing in Network System

Subsequently, a processing in the network system according to the first embodiment will be described every plural states.

Restart Service Deciding Process

First, a restart service deciding process in the network system will be described. The restart service deciding process is conducted between a terminal unit and the frame relay exchange FR1, for example, when any one of the terminal units A to C are physically connected to the frame relay exchange FR1, and a line is first opened between the terminal unit and the frame relay exchange FR1. In this example, for example, it is assumed that the terminal unit A is physically connected to the frame relay exchange FR1, and a line is first opened therebetween.

Restart Service Deciding Process by Frame Relay Network

Figure 7:
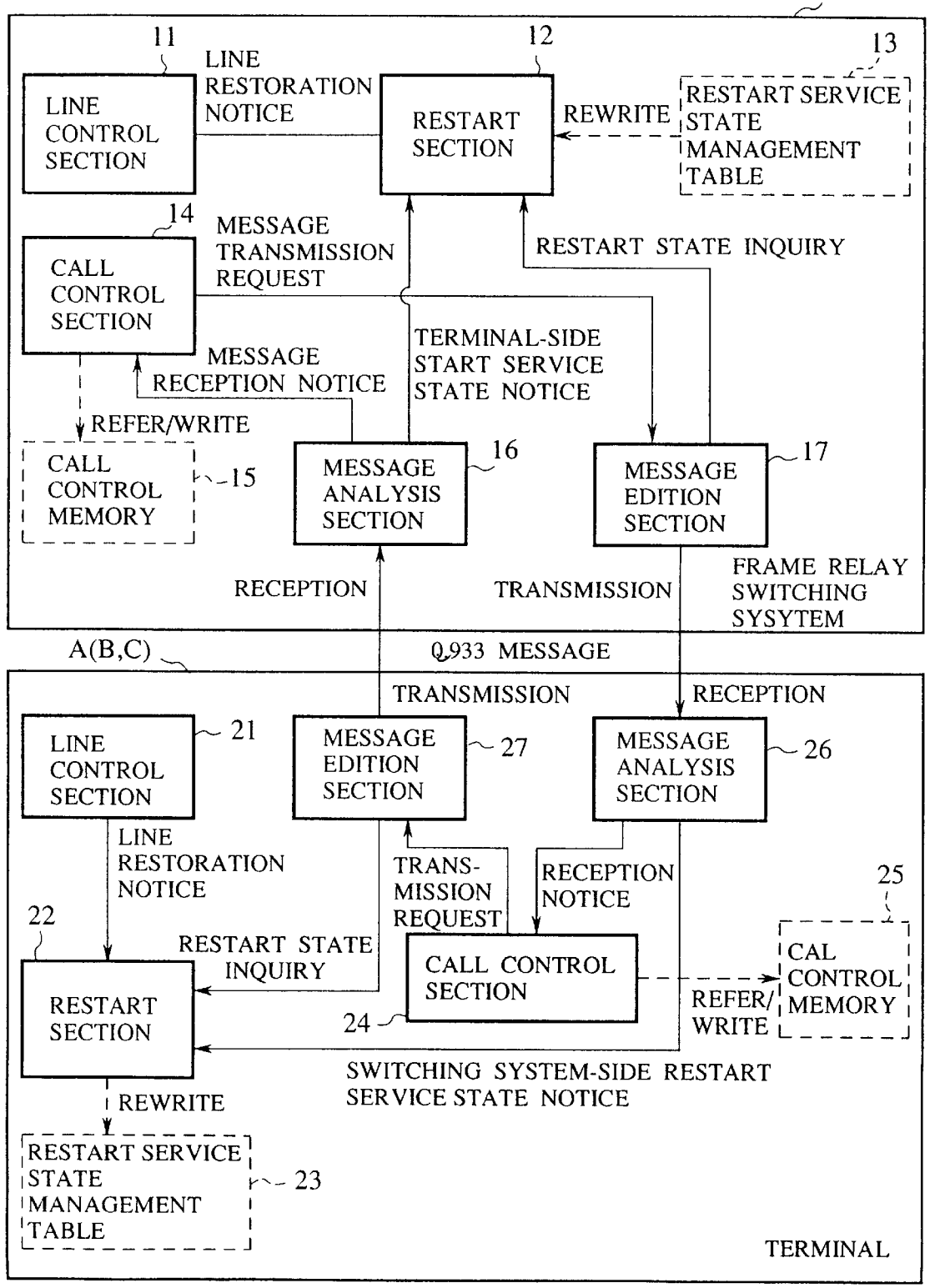
FIG. 7 is an explanatory diagram showing the operation of the frame relay exchange and the terminal unit.

First, a restart service deciding process by the frame relay exchange FR1 will be described. FIG. 7 is an explanatory diagram showing the operation of the restart service deciding process, and FIGS. 8 and 9 are flowcharts showing the restart service deciding process by the frame relay exchange FR1.

Figure 8:
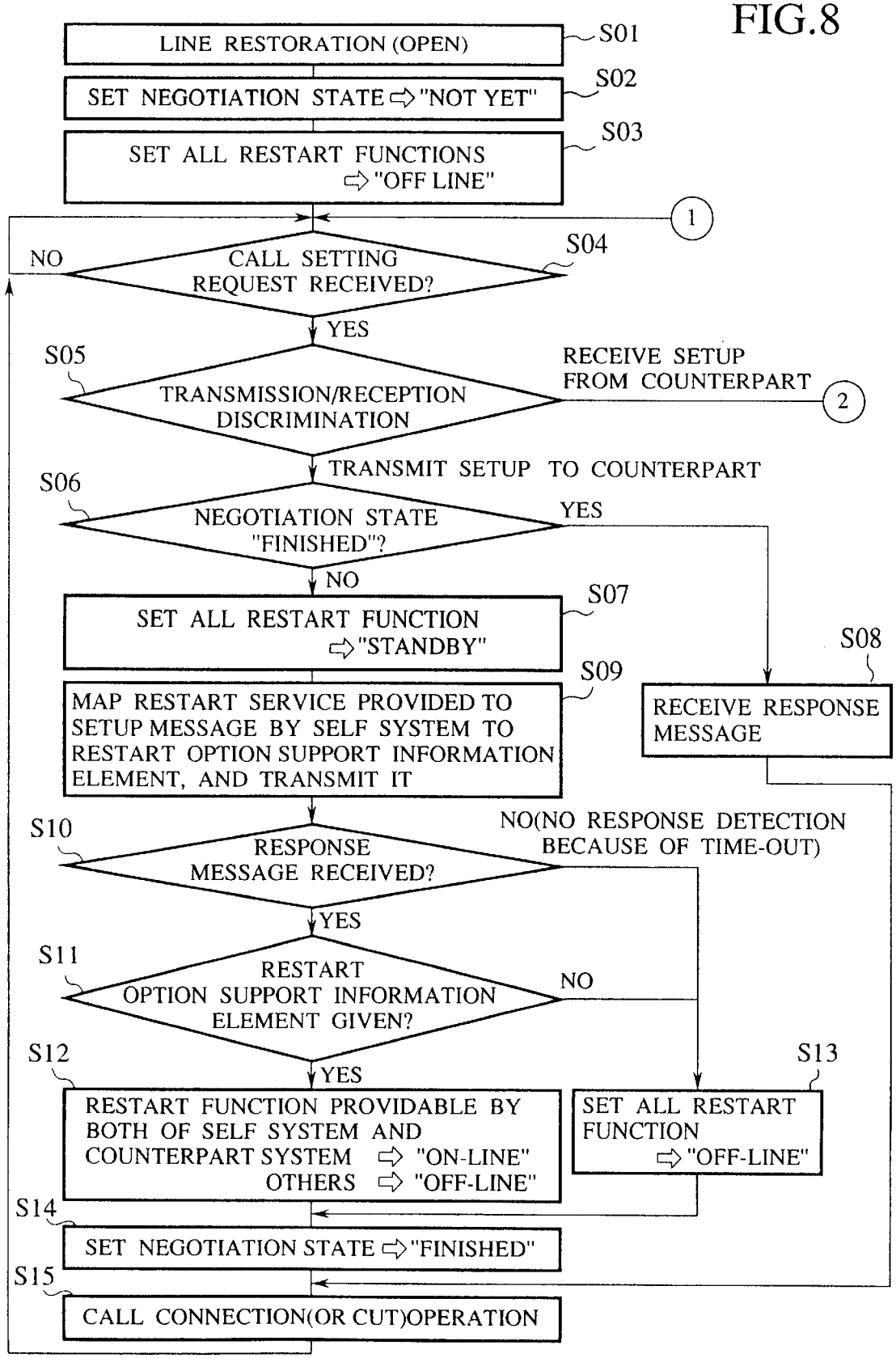
FIG. 8 is a flowchart showing a restart service deciding process due to the frame relay exchange.
Figure 9:
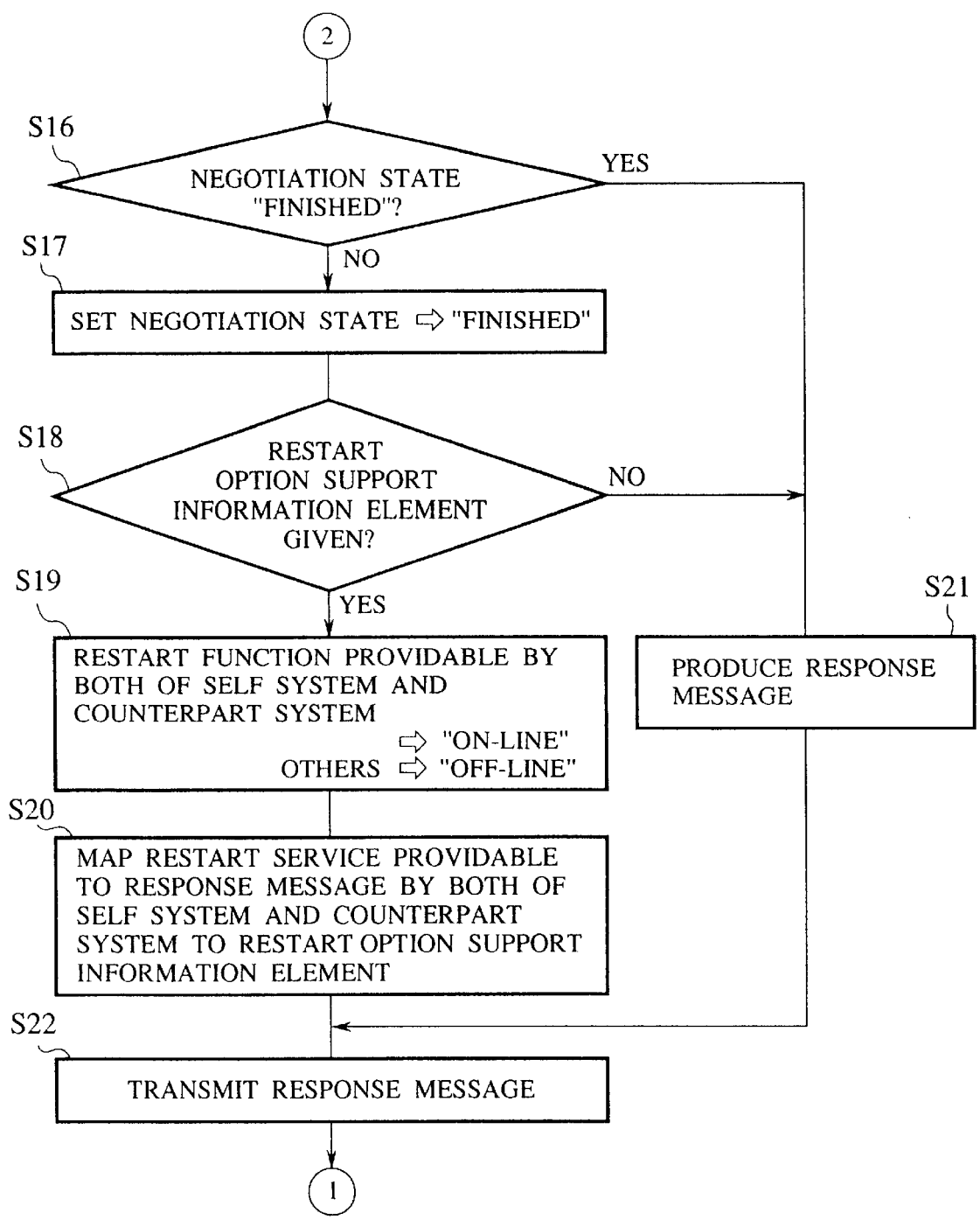
FIG. 9 is a flowchart showing a restart service deciding process due to the frame relay exchange.

As shown in FIGS. 7 and 8, when a line is opened, the line control section 11 of the frame relay exchange FR1 shown in FIG. 2 transmits a notice (line release notice) representing that a line is opened between the frame relay exchange FR1 and the terminal unit A to the restart section 12 (step S01).

Upon receiving the line release notice, the restart section 12 sets "negotiation incompletion" to the region 113a (refer to FIG. 3) in the restart management table 13. As a result, the negotiation of the restart procedure to the terminal unit A is set to "incompletion" (step S02).

Subsequently, the restart section 12 sets "off-line" to all of the regions 113b to 113g in the restart management table 13. As a result, all of the restart procedures executable on the terminal unit A by the frame relay exchange FR1 is made in an off-line state (step S03). Thereafter, the call control section 14 is brought into a state where it receives a call setting request from the terminal unit A (step S04).

In this example, in the case where a call setting request is received from any one of the terminal units A to D (step S04, yes), a call setting procedure is conducted in accordance with the advice Q.931 in the frame relay exchange FR1. In other words, the message analysis section 16 judges the transmission/reception of the call setting request as received (step S05).

In this situation, in the case where the received call setting request is a message "SETUP (call setting)" that the terminal unit A requests a call setting to any one of the terminal units B to D, the message analysis section 16 judges the reception of the call setting request, and the processing proceeds to step S16 shown in FIG. 9.

On the contrary, in the case where the received call setting request is a message "SETUP" that any one of the terminal units B to D requests a call setting to the terminal unit A, the message analysis section 16 judges the transmission of the call setting request. Then, the message analysis section 16 gives a message reception notice to the call control section 14, and gives a terminal-side restart service state notice to the restart section 12. Thereafter, the processing proceeds to step S06.

When the processing proceeds from step S05 to S06, the call control section 13 extracts a call No. and a DLCI No. given to the message reception notice so that they are written in the proper region of the call control memory 15.

In the case where the processing proceeds to step S06, the restart section 12 judges, after receiving the notice from the message analysis section 16, whether any information of "negotiation incompletion" and "negotiation completion" (already done) has been set in the region 113a of the restart management table 13, or not, that is, whether the negotiation of the restart procedure has been completed between the frame relay exchange FR1 and the terminal unit A, or not.

In this situation, in the case where "negotiation completion" has been set in the region 113a (step S06; yes), after the message "SETUP (call setting)" is transmitted to the transmitted terminal unit (terminal unit A) by the message edition section 17, the processing proceeds to step S08. On the contrary, in the case where "negotiation incompletion" has been set in the region 113a (step S06; no), the processing proceeds to step S07.

In the case where the processing proceeds to step S07, the restart section 12 sets "standby" to all of the regions 113b to 113g in the restart management table 13. As a result, the restart procedure between the frame relay exchange FR1 and the terminal unit A is getting negotiated.

Sequentially, the call control section 14 gives an edition instruction (message transmission request) of "SETUP" to the message edition section 17. As a result, the message edition section 17 edits "SETUP". In this situation, the message edition section 17 inquires of the restart section 12 the restart procedure (restart service) providable by the frame relay exchange FR1, as a result of which the restart section 12 extracts the storage contents in the regions 113b to 113g of the restart management table 13 and gives them to the message edition section 17.

Then, the message edition section 17 maps the information received from the restart section 12 to a user-inherent restart option support information element within "SETUP" by use of a fixation shift procedure (step S09). Then, "SETUP" which has been edited by the message edition section 17 is transmitted to the terminal unit A.

Figure 12:
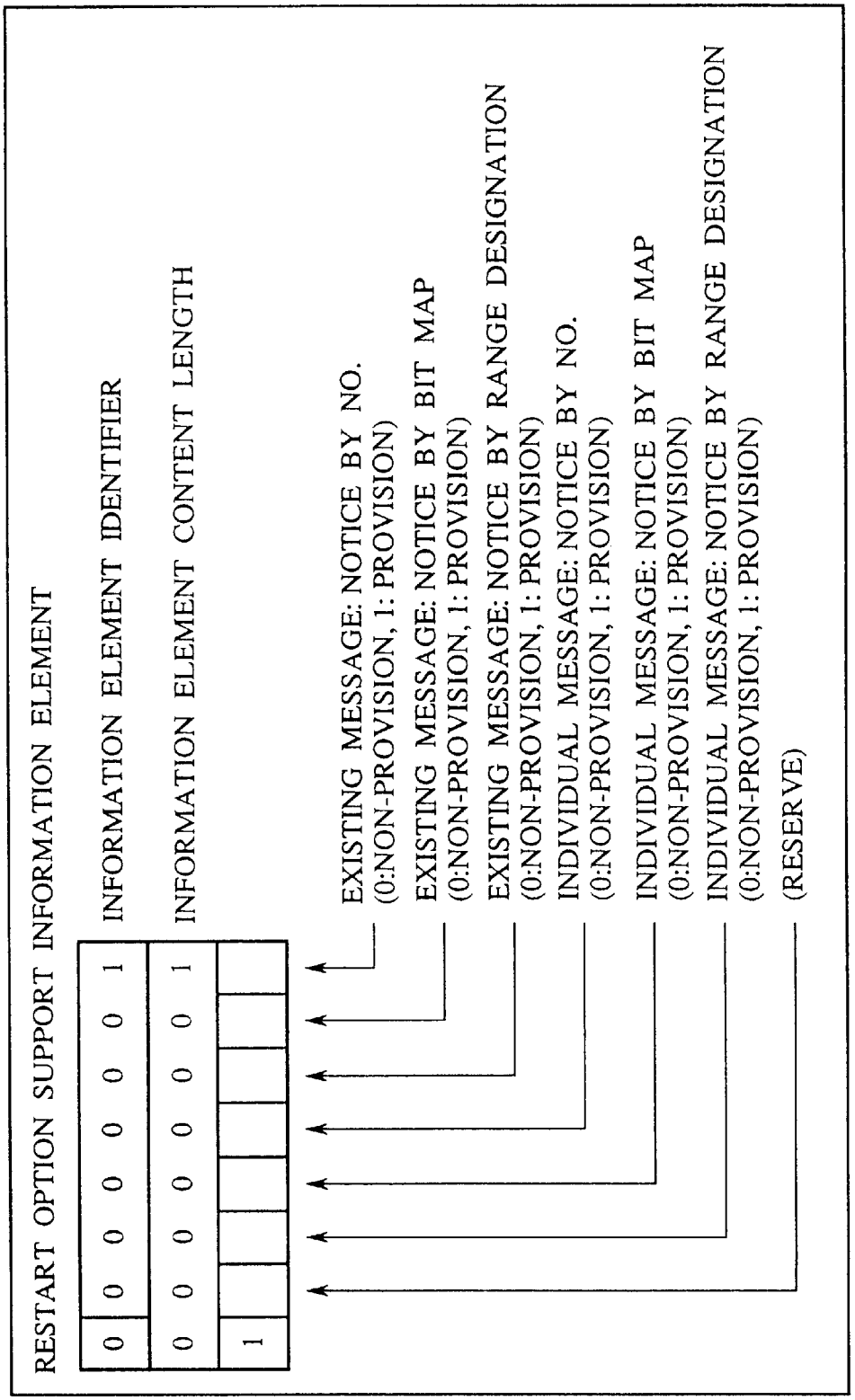
FIG. 12 is an explanatory diagram showing a restart service support information element.

Now, the restart option support information element (hereinafter referred to as "restart information element") set within "SETUP" will be described. FIG. 12 is an explanatory diagram of the information element. As shown in FIG. 12, the information element is made up of an information element identifier set in a first octet, an information element content length set in a second octet and restart service information set in a third octet.

In this example, the information element identifier is data representing that the information element is a restart information element, and the information element content length represents the data length of the restart information element. The sort of the restart procedure is assigned to the respective first to sixth bits of the third octet where bits representative of whether the frame relay exchange FR1 can provide the respective restart procedures, or not, are stored.

Upon the completion of the processing of step S06, when "SETUP" is transmitted to the terminal unit A, a timer not shown within the frame relay exchange FR1 starts to count a predetermine time. Simultaneously, the call control section 14 is brought into a state where it receives a response message from the terminal unit A (step S10).

In this situation, in the case where a response message ("CALL PROC (call setting receipt)" or "REL COMP") from the terminal unit A is received in the message analysis section 16 before the timer not shown counts the predetermined time (step S10; yes), the processing proceeds to step S11. On the contrary, in the case where the timer not shown counts the predetermined time (step S10; no), it is judged that there is no response to "SETUP" from the terminal unit A, and the processing proceeds to step S13.

In the case where the processing proceeds to step S11, the response message reception notice is given to the call control section 14 from the message analysis section 16. Then, the call control section 14 extracts the call No. and DLCI No. to the terminal unit A from the message reception notice, and stores them in the proper region of the call control memory 15.

Subsequently, the message analysis section 16 judges whether the restart information element of the terminal unit A is given to the response message, or not. In this situation, in the case where the information element is given thereto, the processing proceeds to step S12. On the contrary, in the case where the information element is not given thereto, the processing proceeds to step S13.

In the case where the processing proceeds to step S12, the message analysis section 16 extracts the information element from the response message and transmits the information element to the restart section 12 as a terminal-side restart service state notice. Then, the restart section 12 sets "on-line" to a region of the restart service providable in both of the frame relay exchange FR1 and the terminal unit A among the regions 113b to 113g of the restart management table 13, and sets "off-line" to the regions of other restart services, referring to the contents of the information element (refer to FIG. 12). Thereafter, the processing proceeds to step S14.

On the other hand, in the case where the processing proceeds to step S13, the restart section 12 sets "off-line" to all of the regions 113b to 113g in the restart management table 13. Thereafter, the processing proceeds to step S14.

In the case where the processing proceeds to step S14, the restart section 12 sets "negotiation completion" to the region 113a in the restart management table 13. Thereafter, the processing proceeds to step S15.

In the case where the processing proceeds to step S08, the call control section 14 waits for the transmission of the response message of "SETUP". Then, upon receiving the response message of "SETUP", the call control section 14 conducts a call connection process (call setting process) (step S15). However, in the case where there is no response message of "SETUP" from the terminal unit A, a call cutting process is conducted in step S15. Thereafter, the processing returns to step S04.

By the way, in the case where the processing proceeds to step S16 (refer to FIG. 9), the message analysis section 16 gives the terminal-side restart service state notice to the restart section 12. Then, the restart section 12 judges whether "negotiation completion" has been set to the region 113a of the restart management table 13, or not. In this situation, in the case where "negotiation completion" has been set (step S16; yes), the processing proceeds to step S21, but in the case where the "negotiation completion" has not been set (step S16, no), the processing proceeds to step S17.

In the case where the processing proceeds to step S17, the restart section 12 sets "negotiation completion" to the region 113a of the restart management table 13. Subsequently, the restart section 12 judges whether the restart information element of the terminal unit A has been given to "SETUP" as received, or not (step S18).

In this situation, in the case where the restart information element has been given to "SETUP", the processing proceeds to step S19, whereas in the case where it has not been give thereto, the processing proceeds to step S21.

In the case where the process proceeds to step S19, "standby" is set to a region corresponding to the restart service providable by both of the frame relay exchange FR1 and the terminal unit A among the regions 113b to 113g on the basis of the contents of the restart information element given to "SETUP".

On the other hand, when the message analysis section 16 receives "SETUP", the call control section 16 receives the reception notice of "SETUP" from the message analysis section 17 and gives the transmission request of the response message of "SETUP" to the message edition section 16. In this situation, the call control section 14 gives the transmission request of "CALL PROC" in the case of connecting the call, but gives the transmission request of "REL COMP" in the case of refusing the call connection. The call control section 14 extracts the call No. and the DLCI No. to the terminal unit A from the message reception notice and stores them in the proper region of the call control memory 15 in the case of conducting the call connection.

Upon receiving the transmission request, the message edition section 16 produces a response message. In this situation, the message edition section 16 inquires of the restart section 12 the restart service providable by the terminal unit A. The restart section 12 gives the edition request of the user inherent information element (restart information element) that a restart service exists to the message edition section 16 in the case where "standby" has been set in any one of the regions 113b to 113g of the restart management table 13. Also, the restart section 12 gives the contents of the restart service providable by both of the frame relay exchange FR1 and the terminal unit A to the message edition section 16.

Thereafter, the restart section sets "on-line" to a region corresponding to the restart service providable by both of the frame relay exchange FR1 and the terminal unit A among the regions 113b to 113g, and sets "off-line" to other regions. Thereafter, the processing proceeds to step S20.

In the case where the processing proceeds to step S20, the message edition section 17 edits the response message. In this situation, the message edition section 17 maps the contents of the restart service providable by the frame relay exchange FR1 and the terminal unit A which is received from the restart section 12 to the restart information element within the response message. Thereafter, the processing proceeds to step S22.

In the case where the processing proceeds to step S21, a response message is produced. The contents of the restart service is not mapped to that response message. Thereafter, the processing proceeds to step S22.

In the case where the processing proceeds to step S22, the message edition section 17 transmits the response message which has been edited to the terminal unit A. Thereafter, the processing returns to step S04.

Restart Service Deciding Process by Terminal Unit

Figure 5:
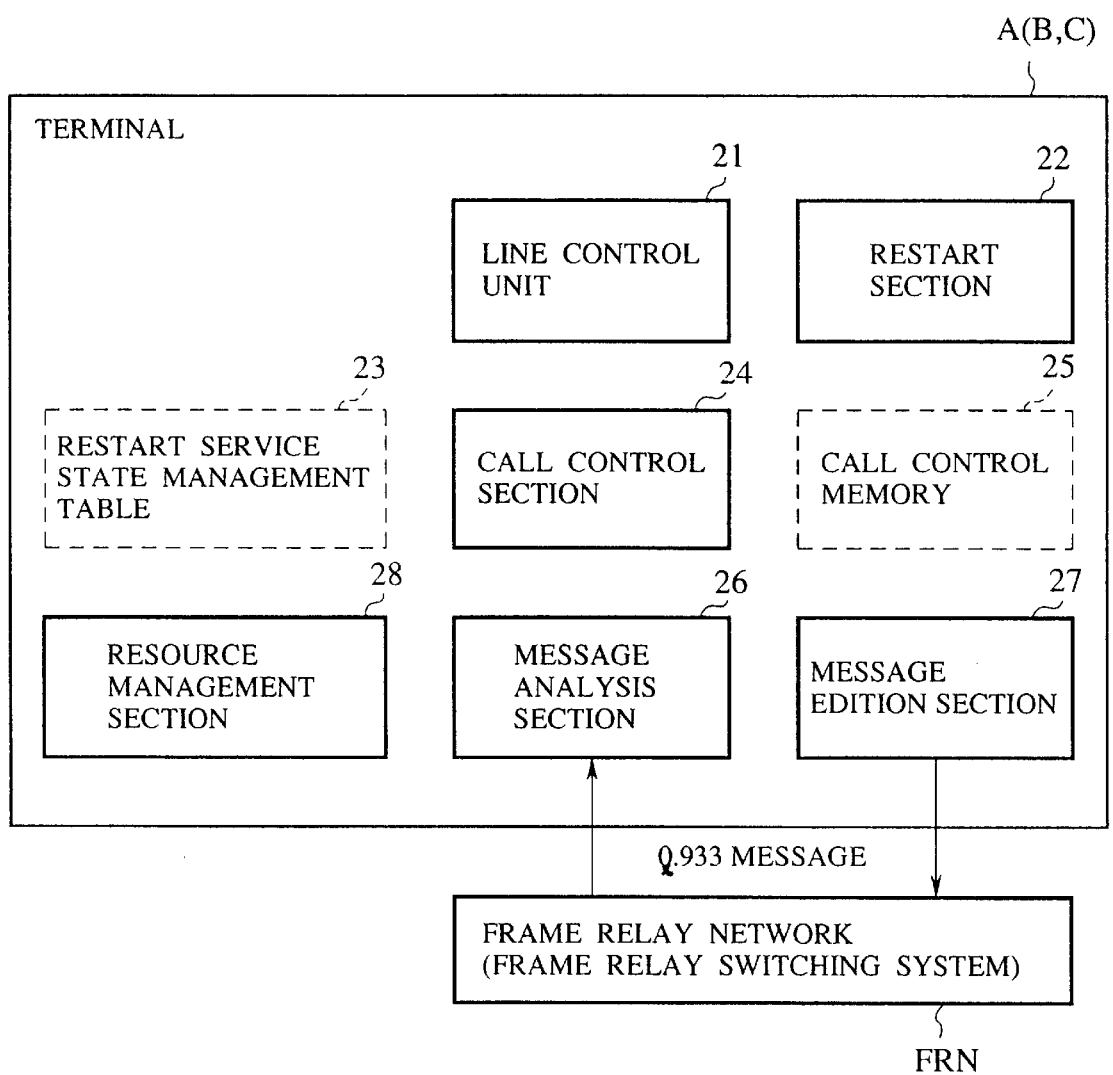
FIG. 5 is a functional block diagram showing a terminal unit.
Figure 10:
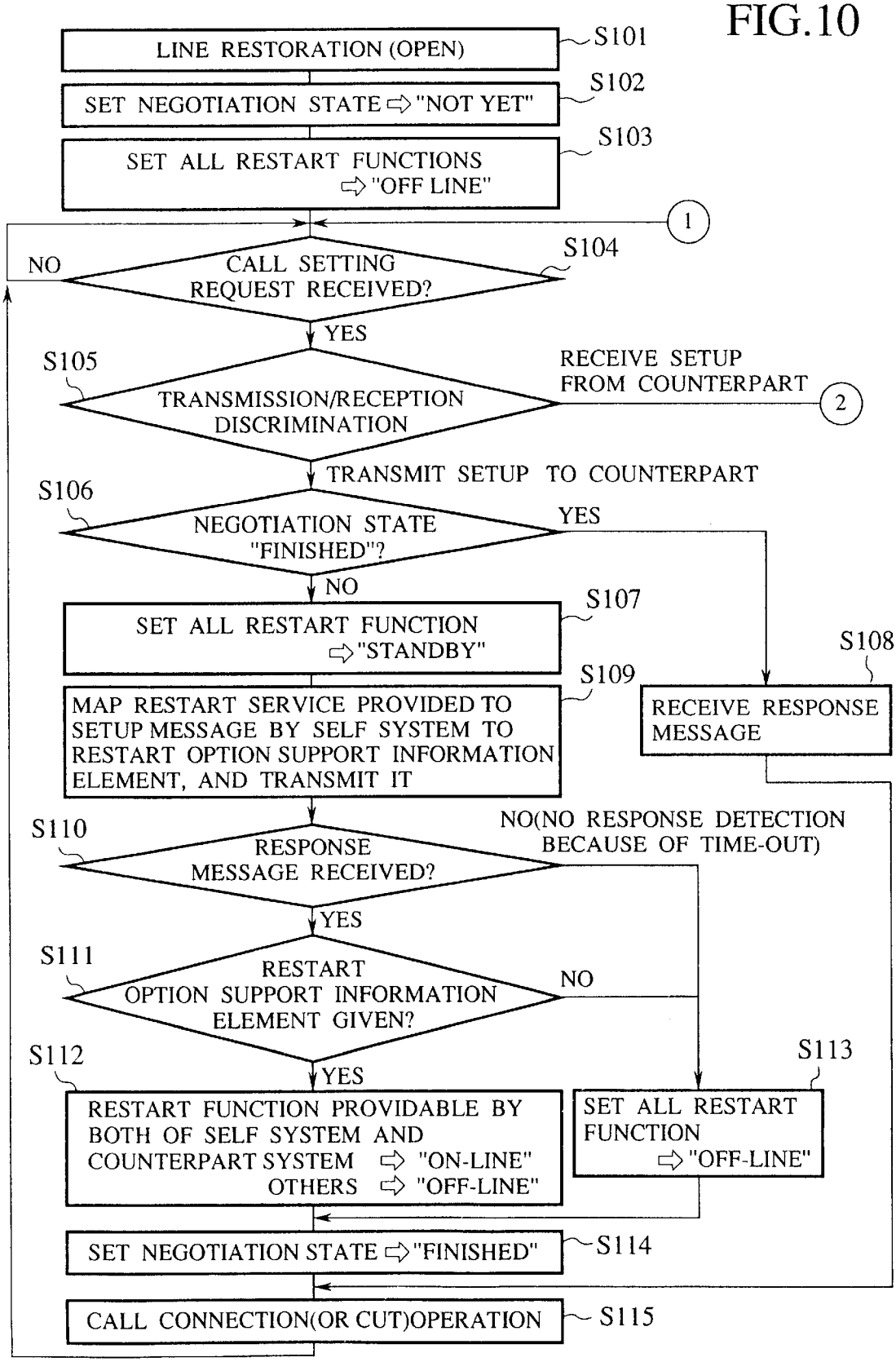
FIG. 10 is a flowchart showing a restart service deciding process due to the terminal unit.
Figure 11:
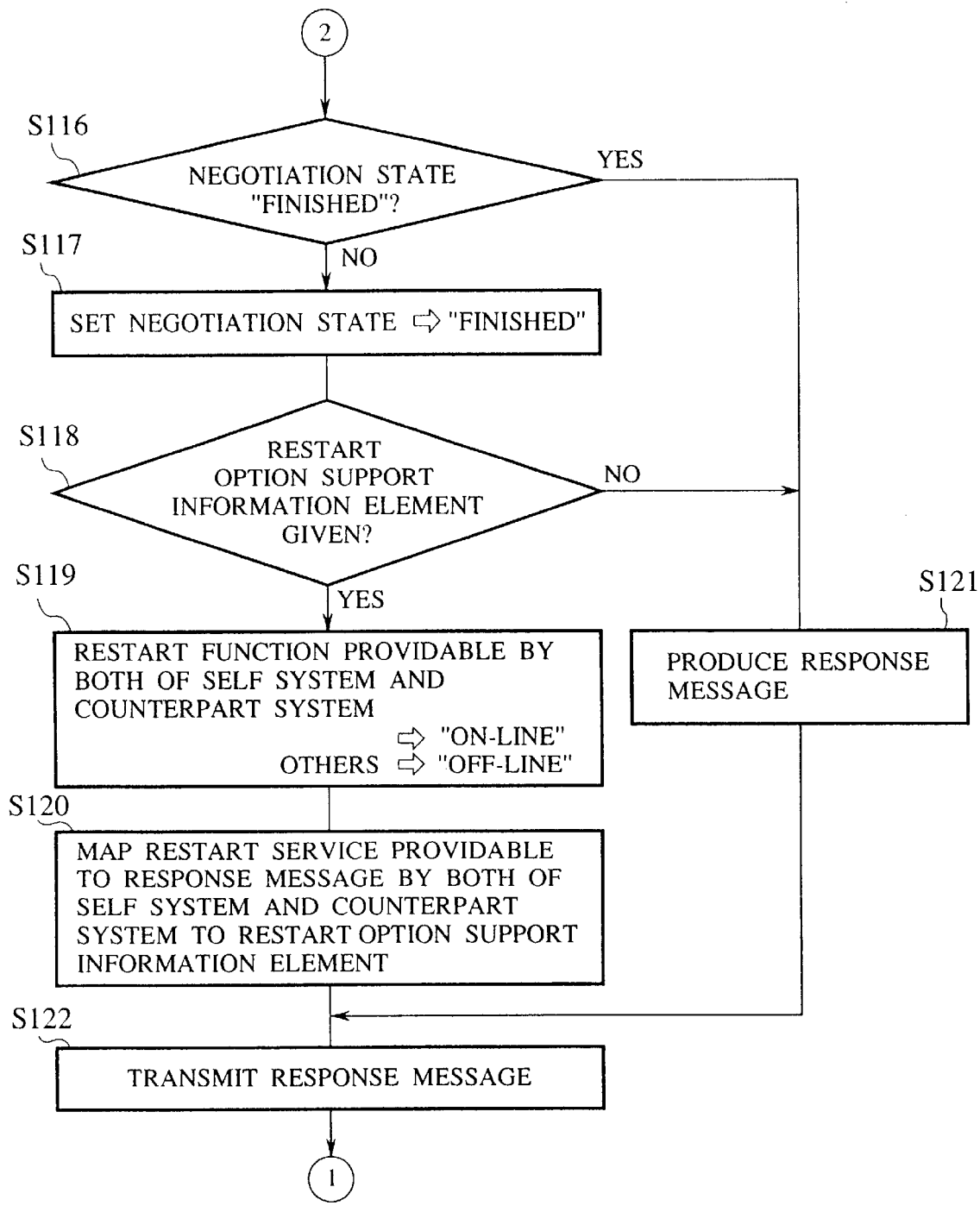
FIG. 11 is a flowchart showing a restart service deciding process due to the terminal unit.

Subsequently, the restart service deciding process by the terminal unit A will be described. FIGS. 10 and 11 are flowcharts showing the restart service deciding process by the terminal unit A. As shown in FIGS. 7 and 10, when a line is opened between the terminal unit A and the frame relay exchange FR1, the line control section 21 of the terminal unit A shown in FIG. 5 transmits a line restoration notice representing that the line is opened between the frame relay exchange FR1 and the terminal unit A to the restart section 12 (step S101).

Upon receiving the line restoration notice, the restart section 22 sets "negotiation incompletion" to the region 123a (refer to FIG. 3) in the restart management table 23 (step S102).

Subsequently, the restart section 22 sets "on-line" to all of the regions 123b to 123g in the restart management table 23. As a result, all the restart service executable by the terminal unit A becomes in an off-line state (step S103).

Thereafter, the call control section 24 becomes in a state where it receives the call setting request from the terminal unit A (step S104).

In this example, in the case where a call setting request is received from an input unit (key board, mouse or the like) not shown of the terminal unit A, or in the case where a call setting request is received from the frame relay exchange FR1 (step S104; yes), the message analysis section 26 judges the transmission/reception of the call setting request as received (step S105).

In this situation, in the case where the call setting request is "SETUP" transmitted from the frame relay exchange FR1, the processing proceeds to step S116 shown in FIG. 11. On the contrary, in the case where the call setting request is inputted from the input unit not shown, the message analysis section 26 gives the message reception notice to the call control section 24, and gives the terminal-side restart service state notice to the restart section 22. Thereafter, the processing proceeds to step S106.

When the processing proceeds from step S105 to step S106, the call control section 23 extracts the call No. and the DLCI No. which have been given to the message reception notice so that they are written in the proper region of the call control memory 25 (refer to FIG. 6B).

When the processing proceeds to step S106, the restart section 22 judges whether the negotiation of the restart procedure has been completed between the terminal unit A and the frame relay exchange FR1, or not. In this situation, in the case where the negotiation has been completed, after "SETUP" is transmitted from the message edition section 27 to the frame relay exchange FR1, the processing proceeds to step S108. On the contrary, in the case where the negotiation has not yet been completed, the processing proceeds to step S107.

When the processing proceeds to step S107, the restart section 22 sets "STANDBY" to all of the regions 123b to 123g in the restart management table 23. Subsequently, the call control section 24 gives the message transmission request to the message edition section 27 so that the message edition section 27 edits "SETUP".

In this situation, the message edition section 27 inquires of the restart section 22 the restart service providable by the terminal unit A. In response thereto, the restart section 22 extracts the storage contents of the regions 123b to 123g in the restart management table 23 and give them to the message edition section 27.

Then, the message edition section 27 maps the information received from the restart section 22 to the restart information element (refer to FIG. 12) within "SETUP" by use of a fixation shift procedure (step S109). The message edition section 27 transmits "SETUP" which has been edited to the frame relay exchange FR1.

Upon the transmission of "SETUP" to the terminal unit A, a timer not shown within the terminal unit A starts to count a predetermined time. Simultaneously, the call control section 24 receives the response message from the frame relay exchange FR1A (step S110).

In this situation, in the case where the response message is received by the message analysis section 16 before the timer not shown counts the predetermined time (step S110; yes), the processing proceeds to step S111. On the contrary, in the case where the timer not shown counts the predetermined time (step S110; no), it is judged that there is no response to "SETUP" from the frame relay exchange FR1, and the processing proceeds to step S113.

In the case where the processing proceeds to step S111, the message analysis section 26 gives the message reception notice to the call control section 24. Then, the call control section 24 extracts the call No. and the DLCI No. to the frame relay exchange FR1 from the message reception notice, and then stores them in the proper region of the call control memory 25.

Subsequently, the message analysis section 26 judges whether the restart information element of the frame relay exchange FR1 has been given to the received response message, or not. In this time, in the case where the restart information element has been given thereto, the processing proceeds to step S112. On the contrary, in the case where the restart information element has not been give to the received response message, the processing proceeds to step S113.

When the processing proceeds to step S112, the message analysis section 26 extracts the restart information element from the response message and gives it to the restart section 22. Then, the restart section 22 sets "on-line" to a region of the restart service providable in both of the frame relay exchange FR1 and the terminal unit A among the regions 123b to 123g of the restart management table 23, and sets "off-line" to the regions of other restart services, referring to the contents of the received information element (refer to FIG. 12). Thereafter, the processing proceeds to step S114.

On the other hand, in the case where the processing proceeds to step S113, the restart section 22 sets "off-line" to all of the regions 123b to 123g in the restart management table 23. Thereafter, the processing proceeds to step S114.

In the case where the processing proceeds to step S114, the restart section 22 sets "negotiation completion" to the region 123a in the restart management table 23. Thereafter, the processing proceeds to step S115.

On the other hand, in the case where the processing proceeds to step S108, the call control section 24 waits for the transmission of the response message of "SETUP". Then, upon receiving the response message of "SETUP", the processing proceeds to step S115.

In step S115, the call connection processing is conducted. However, in the case where there is no response message of "SETUP" from the frame relay exchange FR1 (step S110; no), a call cutting process is conducted in step S115. Thereafter, the processing returns to step S104.

By the way, in the case where the processing proceeds to step S116 (refer to FIG. 11), the message analysis section 26 gives the terminal-side restart service state notice to the restart section 22. Then, the restart section 22 judges whether "negotiation completion" has been set to the region 123a of the restart management table 23, or not. In this situation, in the case where "negotiation completion" has been set (step S116; yes), the processing proceeds to step S121, but in the case where the "negotiation completion" has not been set (step S116, no), the processing proceeds to step S117.

In the case where the processing proceeds to step S117, the restart section 22 sets "negotiation completion" to the region 123a of the restart management table 23. Subsequently, the restart section 22 judges whether the restart information element of the frame relay exchange FR1 has been given to "SETUP" as received, or not (step S118).

In this situation, in the case where the restart information element has been given to "SETUP", the processing proceeds to step S119, whereas in the case where it has not been give thereto, the processing proceeds to step S121.

In the case where the process proceeds to step S119, "standby" is set to a region corresponding to the restart service providable by both of the frame relay exchange FR1 and the terminal unit A among the regions 123b to 123g on the basis of the contents of the restart information element given to "SETUP".

On the other hand, when the message analysis section 26 receives "SETUP", the call control section 26 receives the reception notice of "SETUP" from the message analysis section 27 and gives the transmission request of the response message of "SETUP" to the message edition section 26. In this situation, the call control section 24 gives the transmission request of "CALL PROC" in the case of connecting the call, but gives the transmission request of "REL COMP" in the case of refusing the call connection.

Upon receiving the transmission request, the message edition section 26 produces a response message. In this situation, the message edition section 26 inquires of the restart section 22 the restart service providable by the terminal unit A. The restart section 22 gives the edition request of the user inherent information element (restart information element) that a restart service exists to the message edition section 26 in the case where "standby" has been set in any one of the regions 123b to 123g of the restart management table 23. Also, the restart section 22 gives the contents of the restart service providable by both of the frame relay exchange FR1 and the terminal unit A to the message edition section 26.

Thereafter, the restart section 22 sets "on-line" to a region corresponding to the restart service providable by both of the frame relay exchange FR1 and the terminal unit A among the regions 123b to 123g, and sets "off-line" to other regions. Thereafter, the processing proceeds to step S120.

In the case where the processing proceeds to step S120, the message edition section 27 edits the response message. In this situation, the message edition section 27 maps the contents of the restart service providable by the frame relay exchange FR1 and the terminal unit A which is received from the restart section 22 to the restart information element within the response message. Thereafter, the processing proceeds to step S122.

In the case where the processing proceeds to step S121, a response message is produced. The restart information element is not mapped to that response message. Thereafter, the processing proceeds to step S122.

In the case where the processing proceeds to step S122, the message edition section 27 transmits the response message which has been edited to the terminal unit A. Thereafter, the processing returns to step S104.

By the way, after the restart service has been decided between the frame relay exchange FR1 and the terminal unit A, "negotiation completion" is set to the region 113a of the restart management table 13. Therefore, even if the frame relay exchange FR1 thereafter receives the call setting request relating to the terminal unit A, the processings of step S07 to step S14 (refer to FIG. 8) and the processings of step S17 to S20 (refer to FIG. 9) are not executed. Similarly, even in the terminal unit A, the processings of step S107 to S114 (refer to FIG. 10) and the processings of step S117 to 120 are not executed.

Also, in the case where the restart information element is not contained in "SETUP", the restart section 12 is not started. Also, in the case where the terminal unit that receives "SETUP" to which the restart information element is given is what does not provide the restart service (terminal unit D), the restart information element is abandoned by that terminal unit.

The restart service decided by the above-mentioned restart service deciding process is any one of the services (1) to (6). However, "on-line" may be set to a plurality of restart services. In this case, for example, in executing the restart service, it must be designed that one providable restart service is selected in accordance with a predetermined priority order.

Restart Process in Network System

Then, the restart process (initial setting process) in the network system will be described. The restart process is executed when the terminal units A to D set a plurality of calls through the frame relay exchange FR1 (frame relay network FRN), and a fault occurs in any one of the frame relay FR1, the terminal units A to D and the communication line in the case of conducting data communication.

Figure 13:
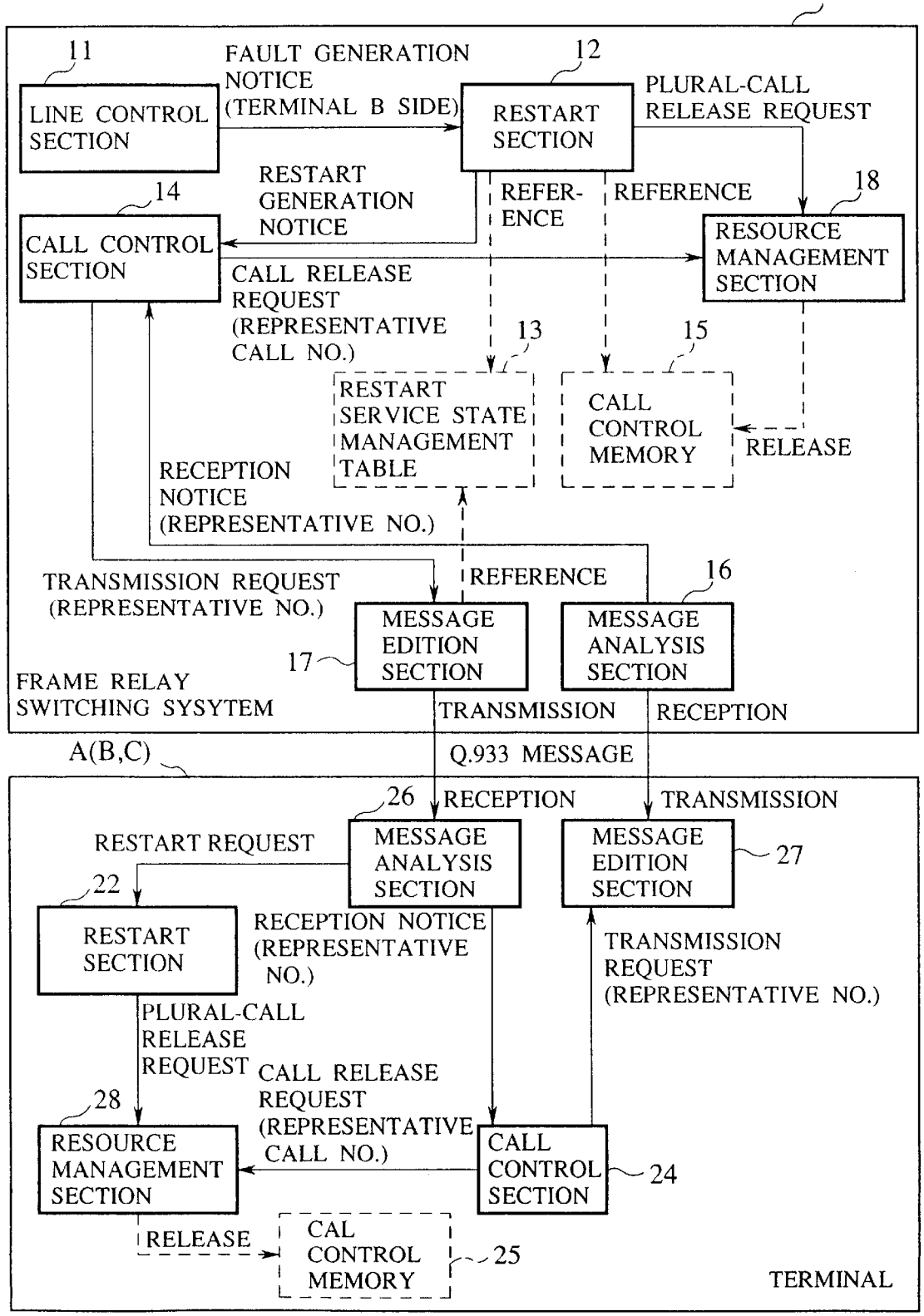
FIG. 13 is an explanatory diagram showing the operation of the frame relay exchange and the terminal unit.

As an example, the restart process between the terminal unit A and the frame relay exchange FR1 shown in FIG. 1 will be described. FIG. 13 is an operational explanatory diagram showing the restart process, FIG. 14 is a flowchart showing a restart process due to the frame relay exchange, and FIG. 15 is a flowchart showing a restart process due to the terminal unit A.

Figure 14:
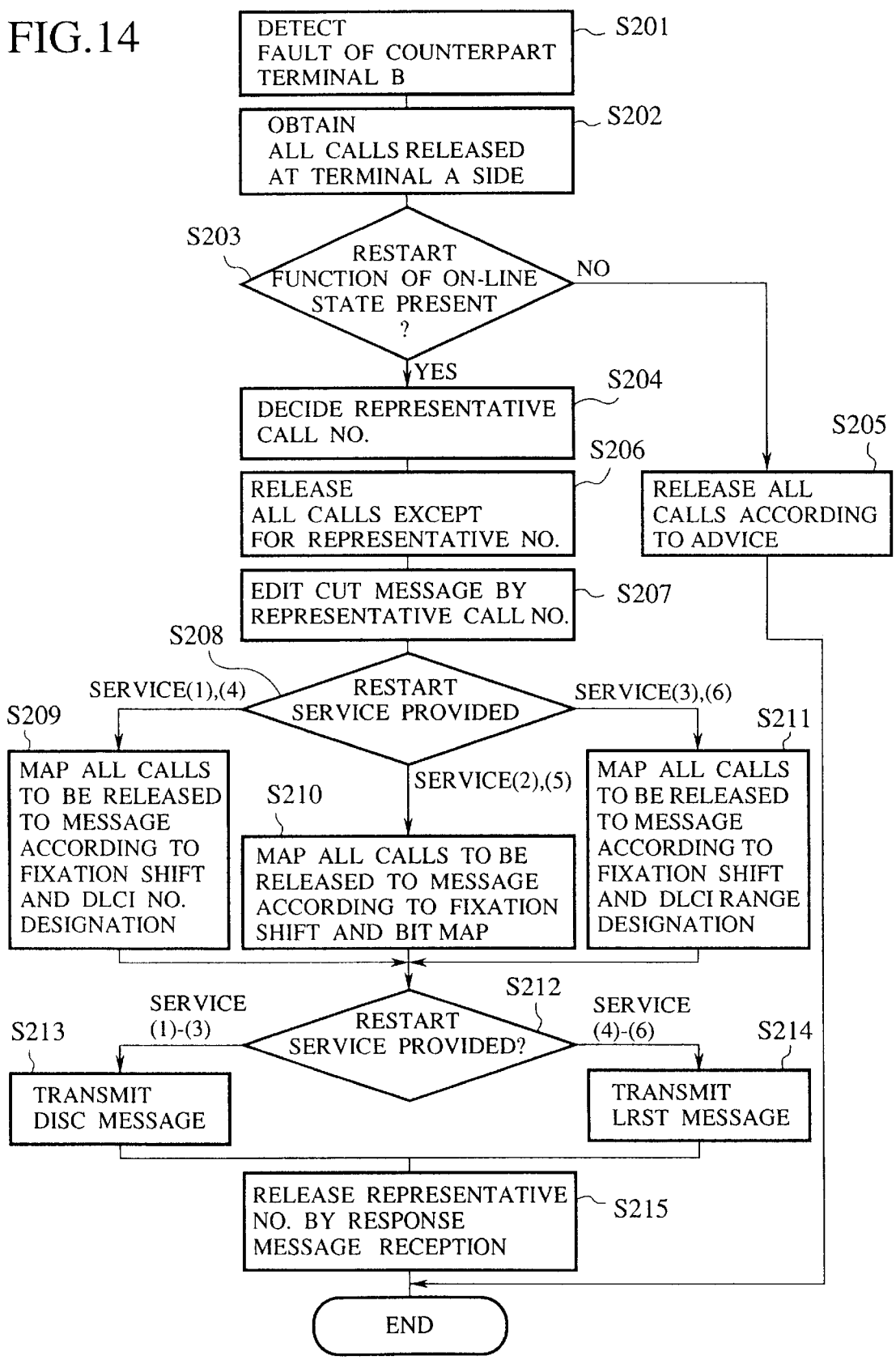
FIG. 14 is a flowchart showing a restart process due to the frame relay exchange.
Figure 15:
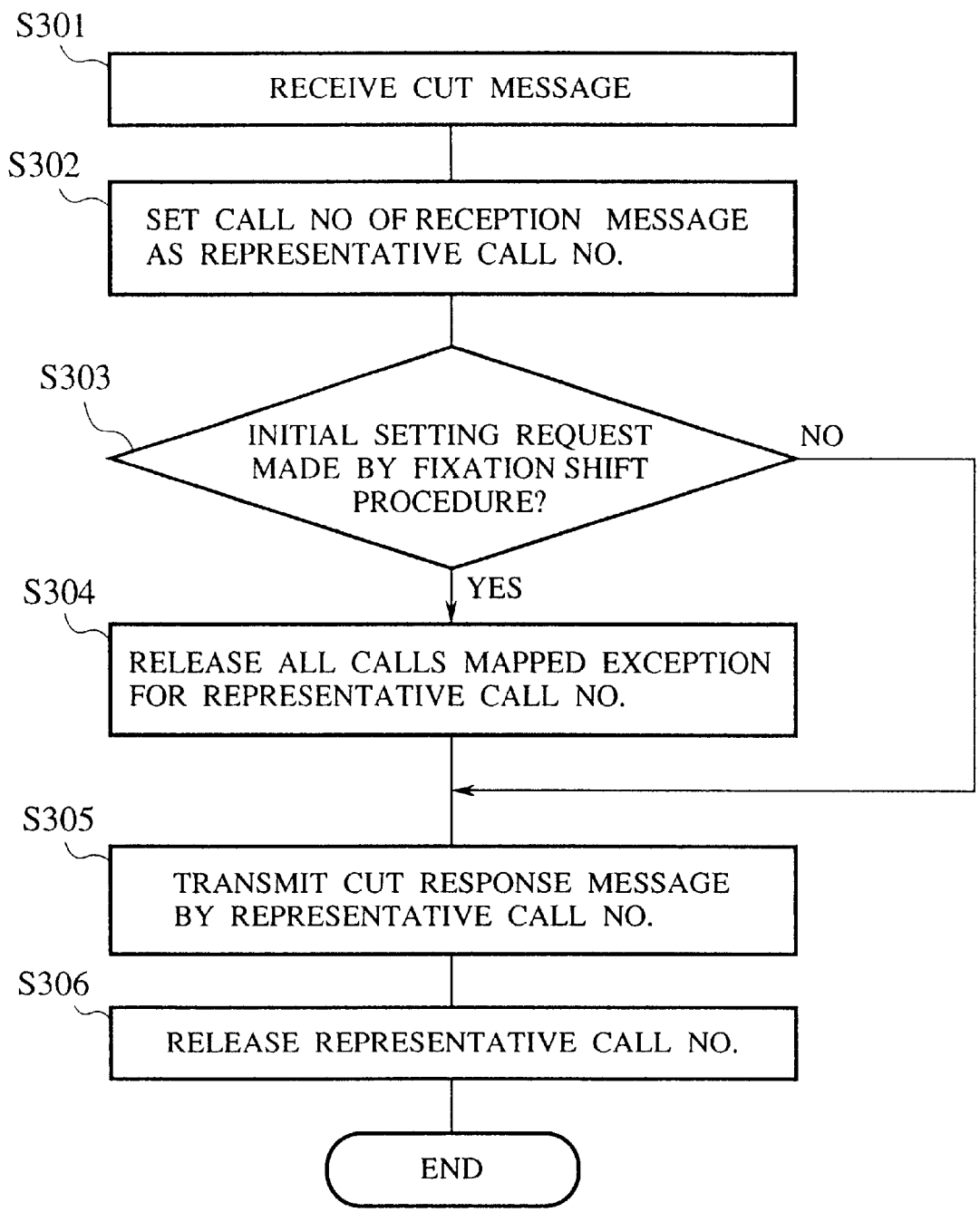
FIG. 15 is a flowchart showing a restart process due to the terminal unit.

As shown in FIGS. 13 and 14, when the line control section 11 of the frame relay exchange FR1 detects a fault of the terminal unit B (step S201), the line control section 11 gives a fault generation notice of the terminal unit B to the restart section 12.

In response thereto, the restart section 12 recognizes that all or parts of calls set between the restart section 12 and the terminal unit A should be cut according to the fault generation notice, and asks a plurality of calls to be released (cut), referring to the storage contents of the call control memory 15 (information relating to a plurality of calls set between the terminal unit A and the terminal unit B) (step S202).

Subsequently, the restart section 12 judges whether the restart service to which "on-line" is set exists, or not, referring to the storage contents (refer to FIG. 6) of the regions 113b to 113g in the restart management table 13 (step S203). In this situation, in the case where the restart service exists, the processing proceeds to step S204, whereas in the case where no restart service exists, the processing proceeds to step S205.

In the case where the processing proceeds to step S204, the restart section 12 decides a call No. of any one of a plurality of calls obtained in step S202 as a representative No. Then, the restart section 12 gives the representative No., all of the DLCI Nos. corresponding to the plurality of calls or a range (1–n) of the DLCIs to be released and a fact that the restart is generated to the call control section 14 as a restart generation notice. Also, the restart section 12 gives the restart generation notice and information relating to the contents of that notice to the resource management section 18 as a plurality of call release requests.

Upon receiving a plurality of call release requests from the restart section 12, after the resource management section 18 writes the contents that the plurality of calls obtained in step S202 except for the representative call No. have been released over the proper region of the call control memory 15, it releases the calls and DLCI except for the representative call No. (step S206).

Subsequently, upon receiving the restart generation notice from the restart section 12, the call control section 14 gives the transmission request of a call cut message of the representative call No. to the message edition section 17. In this situation, the call control section 14 also requests the message edition section 17 to give the fact that the restart is generated to the cut message.

Then, the message edition section 17 starts to edit the call cut message of the representative call No (step S207). When editing the cut message, the message edition section 17 judges which restart service has been set to "on-line", referring to the storage contents of the regions 113b to 113g in the restart management table 13 (step S208).

In this situation, in the case where the restart service set to "on-line" is the above-mentioned service (1) or (4), the processing proceeds to step S209. In the case where it is the service (2) or (5), the processing proceeds to step S210. In the case where it is the service (3) or (6), the processing proceeds to step S211.

In the case where the processing proceeds to step S209, when the restart service is the service (1), the message edition section 17 edits the cut message of "DISC(cut)" according to ITU-T advice Q.933. In this time, the message edition section 17 uses the initial set display information element of JT-Q.931 as the information element given to "DISC", and maps an initial set class=7 (all DLCIs) or the initial set class=0 (designated DLCI) to "DISC" using a fixation shift procedure. In the case where the initial set class=0 is mapped, a plurality of DLCIs to be cut is contained in "DISC". Thereafter, the processing proceeds to step S212.

On the other hand, in the case where the processing proceeds to step S209, when the restart service is the service (4), the message edition section 17 edits the cut message of "LRST" individually set outside of the advice. In this time, the message edition section 17 uses the initial set display information element of JT-Q.931 as the information element given to "LRST", and maps an initial set class=7 (all DLCIs) or the initial set class=0 (designated DLCI) to "LRST".

In the case where the initial set class=0 is mapped, a plurality of DLCIs to be cut is contained in "LRST". Thereafter, the processing proceeds to step S212.

In the case where the processing proceeds to step S210, when the restart service is the service (2), the message edition section 17 edits "DISC" according to ITU-T advice Q.933. In this time, the message edition section 17 uses the initial set display information element of JT-Q.931 as the information element given to "DISC", and maps an initial set class=7 (all DLCIs) or the initial set class=0 (designated DLCI) to "DISC" using a fixation shift procedure.

In the case where the initial set class=0 is mapped, when there are a plurality of DLCIs to be cut, a bit map (DLCI map identifier information element) indicative of the DLCI to be cut is contained in "DISC". Thereafter, the processing proceeds to step S212.

On the other hand, in the case where the processing proceeds to step S210, when the restart service is the service (5), the message edition section 17 edits the cut message of "LRST" individually set outside of the advice. In this time, the message edition section 17 uses the initial set display information element of JT-Q.931 as the information element given to "LRST", and maps an initial set class=7 (all DLCIs) or the initial set class=0 (designated DLCI) to "LRST" using a fixation shift procedure.

In the case where the initial set class=0 is mapped, when there are a plurality of DLCIs to be cut, a bit map (DLCI map identifier information element) indicative of all the DLCIs to be cut is contained in "LRST". Thereafter, the processing proceeds to step S212.

In the case where the processing proceeds to step S211, when the restart service is the service (3), the message edition section 17 edits the cut message of "DISC" according to advice Q.933. In this time, the message edition section 17 uses the initial set display information element of JT-Q.931 as the information element given to "DISC", and maps an initial set class=1 (range DLCIs) to "DISC" using a fixation shift procedure.

Also, the message edition section 17 uses the data link connection identifier information element of JT-Q.933, and maps a start No. "1" of DLCI to be released and an end No. "n" of DLCI to be released to "DISC". Thereafter, the processing proceeds to step S212.

On the other hand, in the case where the processing proceeds to step S210, when the restart service is the service (6), the message edition section 17 edits the cut message of "LRST" individually set outside of the advice. In this time, the message edition section 17 uses the initial set display information element of JT-Q.931 as the information element given to "LRST", and maps an initial set class=1 (range DLCIS) to "LRST" using a fixation shift procedure.

Also, the message edition section 17 uses the data link connection identifier information element of JT-Q.933, and maps a range start No. "1" of DLCI to be released and a range end No. "n" of DLCI to be released to "DISC". Thereafter, the processing proceeds to step S212.

The cut message edited in step S209 to S211 contains information indicating that the restart is generated.

In the case where the processing proceeds to step S212, the message edition section 17 judges which of the services (1) to (6) the restart service is. In this situation, in the case where the restart service is any one of the services (1) to (3), the processing proceeds to step S213. On the contrary, in the case where the restart service is any one of the services (4) to (6), the processing proceeds to step S214.

In the case where the processing proceeds to step S213, the message edition section 17 transmits "DISC" which has been edited to the terminal unit A. Thereafter, the processing proceeds to step S215. On the other hand, in the case where the processing proceeds to step S214, the message edition section 17 transmits "LAST" which has been edited to the terminal unit B. Thereafter, the processing proceeds to step S215. As a result, the call cut message of the representative call No. is transmitted to the terminal unit A.

In the case where the processing proceeds to step S215, the frame relay exchange FR1 is brought in a state where it waits for the reception of a response message of "DISC" transmitted in step S213 or "LRST" transmitted in step S214, and upon receiving the response message, a call of the representative call No. is released (cut). Thereafter, the restart process by the frame relay exchange FR1 is completed.

In the case where the processing proceeds to step S205, all of calls set between the terminal units A and B are subjected to a cutting (release) process (for example, a cutting process according to ITU-T advice Q.933) according to an advice. Thereafter, the restart process by the frame relay exchange FR1 is completed.

After the cut message ("DISC" or "LRST") transmitted in step S213 or step S214 is received by the terminal unit A, the restart process shown in FIG. 15 is executed by the terminal unit A.

As shown in FIGS. 13 and 15, when the message analysis section 26 of the terminal unit A receives the cut message from the frame relay exchange FR1 (step S301), the message analysis section 26 sets call No. of the received cut message as a representative call No., and notifies the call control section 24 of the fact that it receives the cut message of the representative call No. (step S302).

Subsequently, the message analysis section 26 judges whether the cut message includes the information that restart is generated, or not, using a fixation shift procedure (step S303). In this situation, in the case where the cut message includes no information that restart is generated (step S303, no), the processing proceeds to step S305. On the contrary, in the case where the cut message includes the information that restart is generated, the processing proceeds to step S304.

In the case where the processing proceeds to step S304, the message analysis section 26 gives the set representative call No., a plurality of DLCI Nos. (DLCI map identifier information element, a range of DLCIs) contained in the cut message, and a fact that restart is generated to the restart section 22 as the restart element.

Upon receiving the restart request, the restart section 22 gives the representative call No. and the DLCI Nos. (DLCI map identifier information element, a range of DLCIs) contained in the cut message to the resource management section 28 as a plural-call release request.

Upon receiving the plural-call release request, the resource management section 28 specifies all the DLCI Nos. and the call Nos. except for the DLCI corresponding to the representative call No. among the DLCI Nos. contained in the cut message.

Then, the resource management section 28 releases (cuts) the calls and DLCIs corresponding to the specified DLCI Nos. and call Nos., and rewrites the storage contents of the call control memory 25 into the contents corresponding to that release operation. In the case where a range of DLCIs is contained in the cut message, all the DLCIs and calls except for DLCI corresponding to the representative call No. are released. Thereafter, the processing proceeds to step S305.

In the case where the processing proceeds to step S305, the call control section 24 that has received the reception notice of the cut message gives the transmission request for transmitting a response message responsive to the cut message for cutting the representative call No. to the message edition section 27. Upon receiving the transmission request, the message edition section 27 edits the response message.

In this situation, in the case where the cut message received in step S301 is "DISC", the message edition section 27 edits a response message "REL". On the other hand, in the case where the cut message is "LRST", the message edition section 27 edits a response message "LRST ACK".

Then, the message edition section 27 transmits "REL" or "LRST ACK" which have been edited to the frame relay exchange FR1. Thereafter, in the case where "REL" is transmitted, when "REL COMP" is received from the frame relay exchange FR1, the call and DLCI corresponding to the representative call No. are released. On the other hand, in the case where "LRST ACK" is transmitted, the call and DLCI corresponding to the representative call No. are immediately released. Then, the start process by the terminal unit A is completed.

A plurality of calls are released one by one between the frame relay exchange FR1 and the terminal unit D through the conventional restart process.

Operational Example of Network System

Subsequently, the operational example of the network system shown in FIG. 1 will be described.

Operational Example of Restart Service Deciding Process

Figure 16:
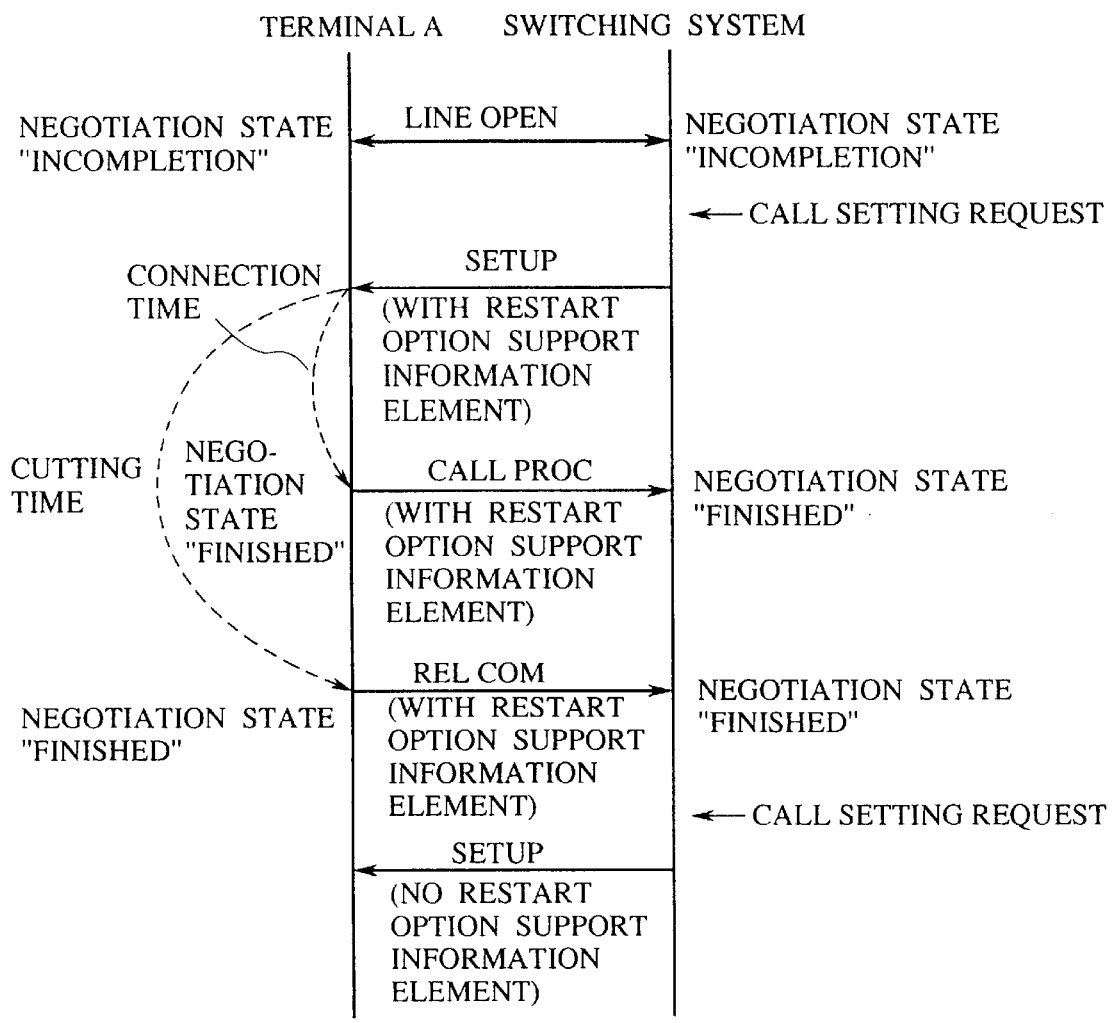
FIG. 16 is a sequential diagram showing an example of the operation of the network system.

First, as an operational example of the above-mentioned network system, an example of the operation in a restart service deciding process conducted between the frame relay exchange FR1 and the terminal unit A will be described. FIG. 16 is a sequential diagram showing an example of the operation in a restart service deciding process.

When the frame relay exchange FR1 and the terminal unit A are connected to each other through a physical line, and a line is opened therebetween (step S01, step S101), the negotiation state of the restart service therebetween is set to "negotiation incompletion" (step S02, step S102), and all of the restart services are set to "off-line" (step S03, step S103).

When the frame relay exchange FR1 receives a call set request, the call control section 14 that receives the call set request requests the transmission of "SETUP" to the message edition section 17. The message edition section 17 produces "SETUP" according to a request from the call control section 14.

In this situation, the message edition section 17 inquires of the restart section 12 the restart service providable by the frame relay exchange FR1. Because all of the restart services are set to "off-line", the message edition section 17 gives the restart information element (refer to FIG. 12) to "SETUP" using a fixation shift procedure.

Information representative of the restart service providable by the frame relay exchange FR1 is mapped to the restart information element. Then, "SETUP" is transmitted to the terminal unit A (step S09). Thereafter, the restart section 12 shifts all the restart services from "off-line" to "standby" (step S07).

In the terminal unit A, upon receiving "SETUP", it is judged whether the restart information element is contained in "SETUP", or not (step S118), and in the case where the restart information element is contained therein, only the restart service providable by both of the terminal unit A and the frame relay exchange FR1 is set to "on-line" (step S119).

In the terminal unit A, a response message ("CALL PROC" or "REL COMP") responsive to "SETUP" is produced. The contents of the restart service providable by both of the terminal unit A and the frame relay exchange FR1 are contained in the response message (step S120). Thereafter, the response message is transmitted to the frame relay exchange FR1 (step S122).

In the frame relay exchange FR1, the contents of the restart service providable by both of the frame relay exchange FR1 and the terminal unit A are extracted from the response message, and only the restart service is set to "on-line" (step S12). Thereafter, the negotiation state is set as "negotiation completion" (step S13), and operation according to the response message (call connection operation or call cutting operation) is conducted (step S15).

Thereafter, even if the call set request to the terminal unit A is received by the frame relay exchange FR1, because the negotiation state is set to "negotiation completion", the restart information element is not contained in "SETUP", and a signaling procedure in a normal call setting is executed.

Operational Example of Restart Process

Subsequently, as an operation example of the network system, an operational example in the restart process will be described.

First Operational Example of Service (1)

Figure 17:
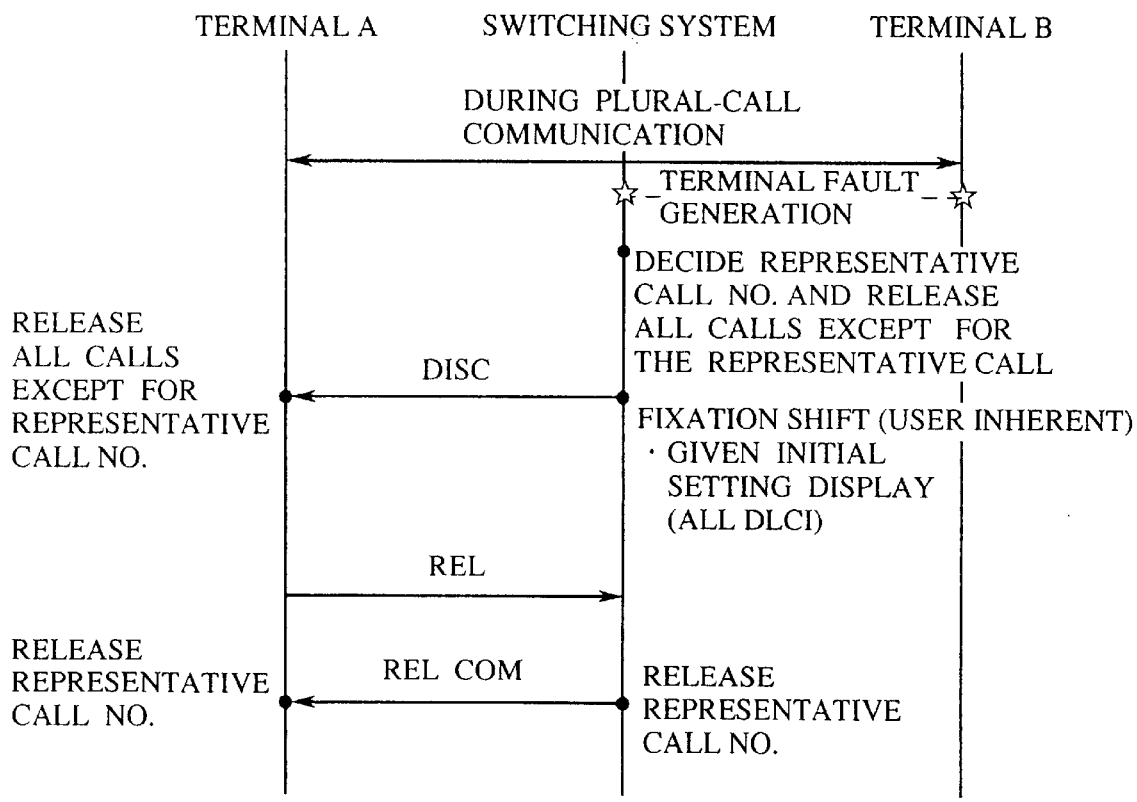
FIG. 17 is a sequential diagram showing another example of the operation of the network system.

FIG. 17 is a sequential diagram showing a first operational example when the above-mentioned service (1) is provided between the frame relay exchange FR1 and the terminal unit A. In this operational example, it is assumed that "on-line" is set to the region 113b (123b) in the restart management table 13(23), and in the case where the line control section 11 detects a fault, all the calls set between the frame relay exchange FR1 and the terminal unit A are so set as to be released (cut).

As shown in FIG. 17, it is assumed that when a plurality of calls are set between the terminal units A and B to conduct data communication, a fault occurs in the terminal unit B. Then, the line control section 11 of the frame relay exchange FR1 (refer to FIG. 13) detects a fault of the terminal unit B (step S201), and recognizes that all the calls should be cut between the terminal units A and B.

Then, the restart section 12 decides any call No. among a plurality of calls set between the terminal units A and B as a representative No. (step S204). As an example, a call No. having the smallest call No. among the plurality of calls which have been already set is decided as the representative call No.

Sequentially, the restart section 12 notifies the resource management section 18 and the call control section 14 of the representative call No., all the DLCIs to be released and the fact that restart is generated. As a result, the resource management section 18 releases all the DLCIs except for the DLCI relating to the representative call No. among the DLCIs used between the terminal units A and B (step S206).

All of those DLCIs contain all the DLCIs used in communication of the terminal units A and B between the frame relay exchange FR1 and the terminal unit B. Also, the call control section 14 gives the transmission request of "DISC" which is an existing call release message to the terminal unit A to the message edition section 16.

The message edition section 17 edits "DISC" of the call of the representative call No. In this time, since the providable restart service is set to the service (1), the message edition section 17 gives setting of cutting all the calls (initial set class=7) to "DISC" using a fixation shift procedure (step S208). Subsequently, information that restart is generated is given to "DISC" (step S208). The "DISC" thus produced is transmitted to the terminal unit A (step S213).

Upon receiving "DISC", the message analysis section 26 of the terminal unit A extracts the information that restart is generated from "DISC" using the fixation shift procedure and gives the information to the restart section 22. The restart section 22 uses the call No. used for transmission of "DISC" as a representative call No. (step S302), obtains all the DLCIs to be released from "DISC", and notifies the resource management section 28 of the fact that the representative call No., those DLCIs and the fact that resource is generated.

Then, the resource management section 28 releases all the calls and DLCIs which are set between the frame relay exchange FR1 and the resource management section 28 except for the call and DLCI corresponding to the representative call No. (S304). Thereafter, "REL" of the call of the representative call No. is transmitted from the terminal unit (S305). Then, "REL COMP" corresponding to "REL" is transmitted from the frame relay exchange FR1 to the terminal unit A, and when "REL COMP" is received by the terminal unit A, the call and DLCI of the representative call No. are released (step S306). In this way, all the calls set between the frame relay exchange FR1 and the terminal unit A are released.

Second Operational Example of Service (1)

Figure 18:
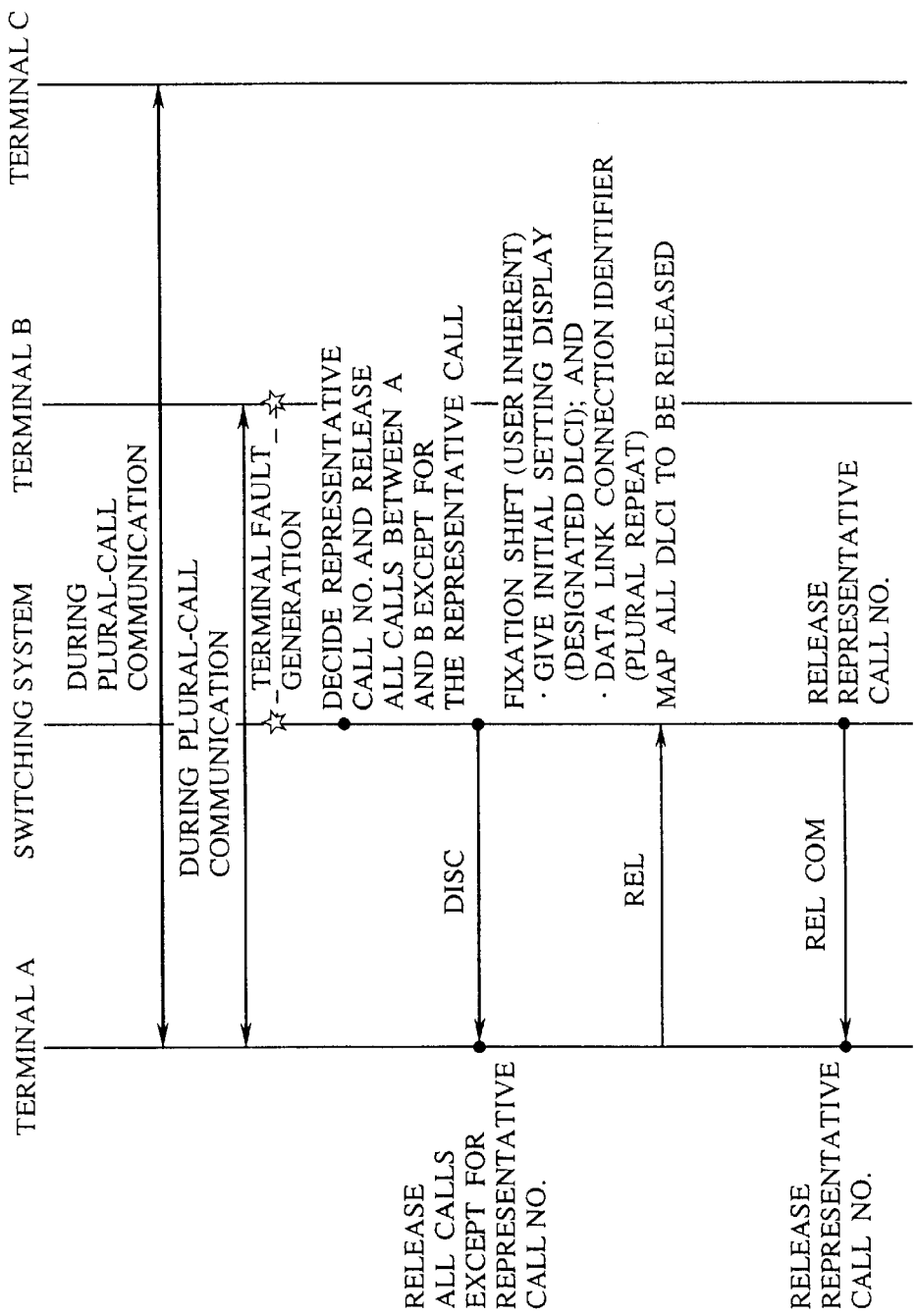
FIG. 18 is a sequential diagram showing still another example of the operation of the network system.

FIG. 18 is a sequential diagram showing a second operational example when the above-mentioned service (1) is provided between the frame relay exchange FR1 and the terminal unit A. In this operational example, it is assumed that "on-line" is set to the region 113b (123b) in the restart management table 13(23), and in the case where the line control section 11 detects a fault, a part of a plurality of calls set between the frame relay exchange FR1 and the terminal unit A is so set as to be released (cut).

As shown in FIG. 18, it is assumed that when a plurality of calls are set between the terminal units A and B and between the terminal units A and C, respectively, to conduct data communication, a fault occurs in the terminal unit B.

The line control section 11 of the frame relay exchange FR1 detects a fault of the terminal unit B (step S201), and recognizes that all the calls related to the terminal unit B should be cut among the calls set between the frame relay exchange FR1 and the terminal unit A.

Then, the restart section 12 obtains all the DLCI used between the terminal unit A and the frame relay exchange FR1 and used in data communication with the terminal unit B, and decides the smallest No. of the DLCI Nos. thus obtained as the representative call No. (step S204).

Sequentially, the restart section 12 notifies the resource management section 18 and the call control section 14 of the representative call No., all the DLCIs to be released and the fact that restart is generated. As a result, the resource management section 18 releases all the DLCIs (including all the DLCIs set between the frame relay exchange FR1 and the terminal unit B) except for the DLCI relating to the representative call No. among the DLCIs to be released (step S206). Also, the call control section 14 give the transmission request of "DISC" which is an existing call release message to the terminal unit A to the message edition section 16.

The message edition section 17 edits "DISC" of the call of the representative call No. In this time, since the restart service is set to the service (1), the message edition section 17 gives setting of cutting all the calls (initial set class=0) to "DISC" using a fixation shift procedure (step S208). Subsequently, information of the DLCIs to be released is given to "DISC" using the data link connection identifier information element of JT-Q.933. Further, information that restart is generated is given to "DISC". The "DISC" which has been edited is transmitted to the terminal unit A (step S213).

Upon receiving "DISC", the message analysis section 26 of the terminal unit A extracts the information that restart is generated from the "DISC" and gives the information to the restart section 22. The restart section 22 uses the call No. used for transmission of "DISC" as a representative call No. (step S302), obtains all the DLCIs to be released from "DISC", and notifies the resource management section 28 of the fact that the representative call No., those DLCIs and the fact that resource is generated.

Then, the resource management section 28 releases all the calls and DLCIs which are used between the terminal units A and B except for the call and DLCI corresponding to the representative call No. (step S304). The subsequent operation is identical with that of the first operational example of the service (1), and therefore its description will be omitted. Finally, only the calls set between the terminal units A and B are released.

In the above manner, because all the calls set between the terminal units A and B are cut through only the cutting procedure of the representative call No., a rapid load is not exerted on the line that connects the terminal unit A and the frame relay exchange FR1, thereby being capable of preventing data communication between the terminal units A and C from being adversely affected.

Operational Example of Service (2)

Figure 19:
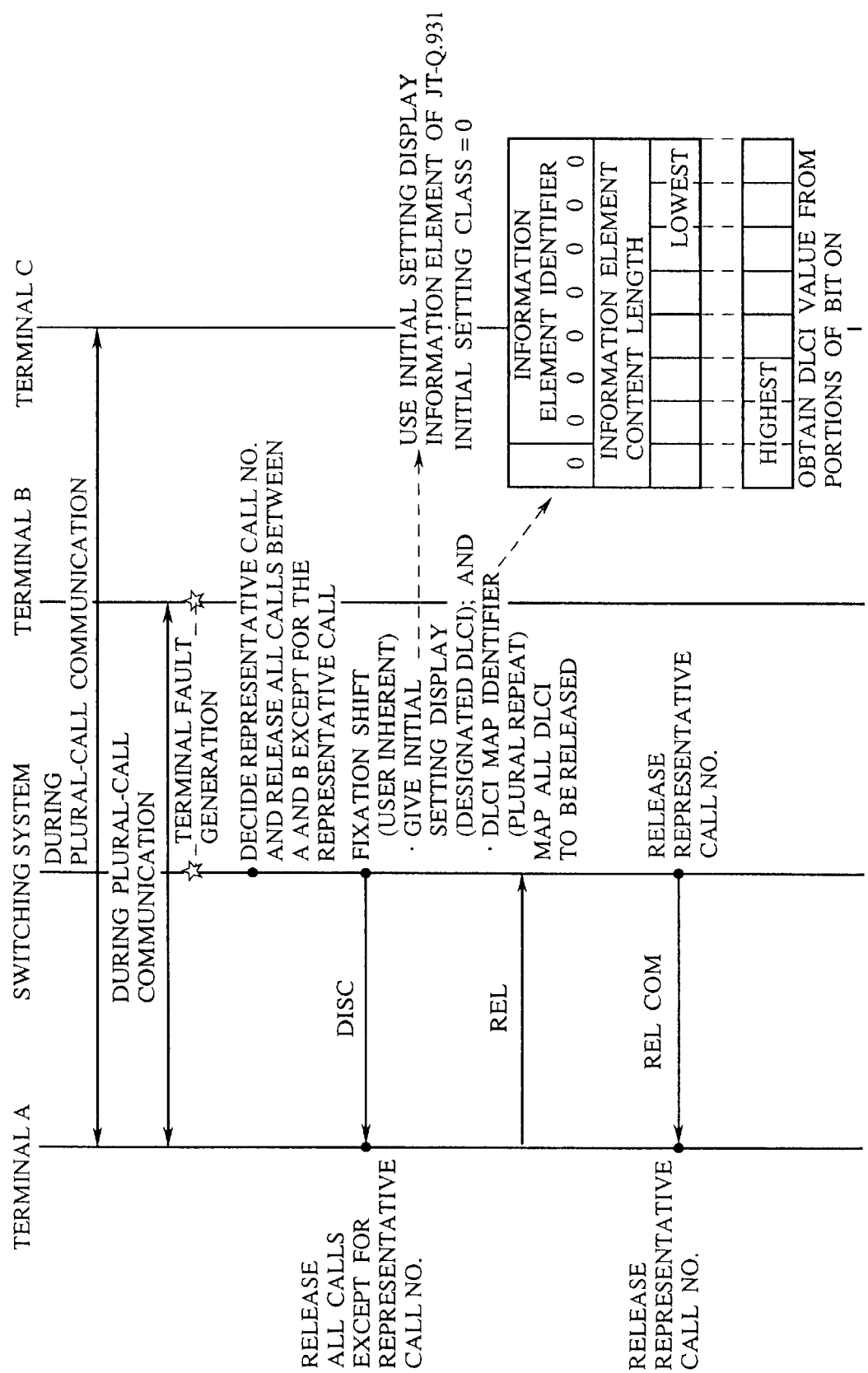
FIG. 19 is a sequential diagram showing yet still another example of the operation of the network system.

FIG. 19 is a sequential diagram showing an operational example when the above-mentioned service (2) is provided between the frame relay exchange FR1 and the terminal unit A. In this operational example, it is assumed that "on-line" is set to the region 113c (123c) in the restart management table 13(23).

Since the operational example shown in FIG. 19 is substantially identical with the operational example shown in FIG. 18, only a difference therebetween will be described. In this operational example, when the message edition section 17 gives the DLCIs to be released to "DISC", all of DLCIs used in communication with the terminal unit B among the DLCIs used between the terminal unit A and the frame relay exchange FR1 are converted into a bit map to produce a DLCI map identifier (refer to FIG. 19), and gives the DLCI map identifier to "DISC". Then, the message analysis section 26 that receives "DISC" including the DLCI map identifier requests DLCI to be released from the DLCI map identifier.

Operational Example of Service (3)

Figure 20:
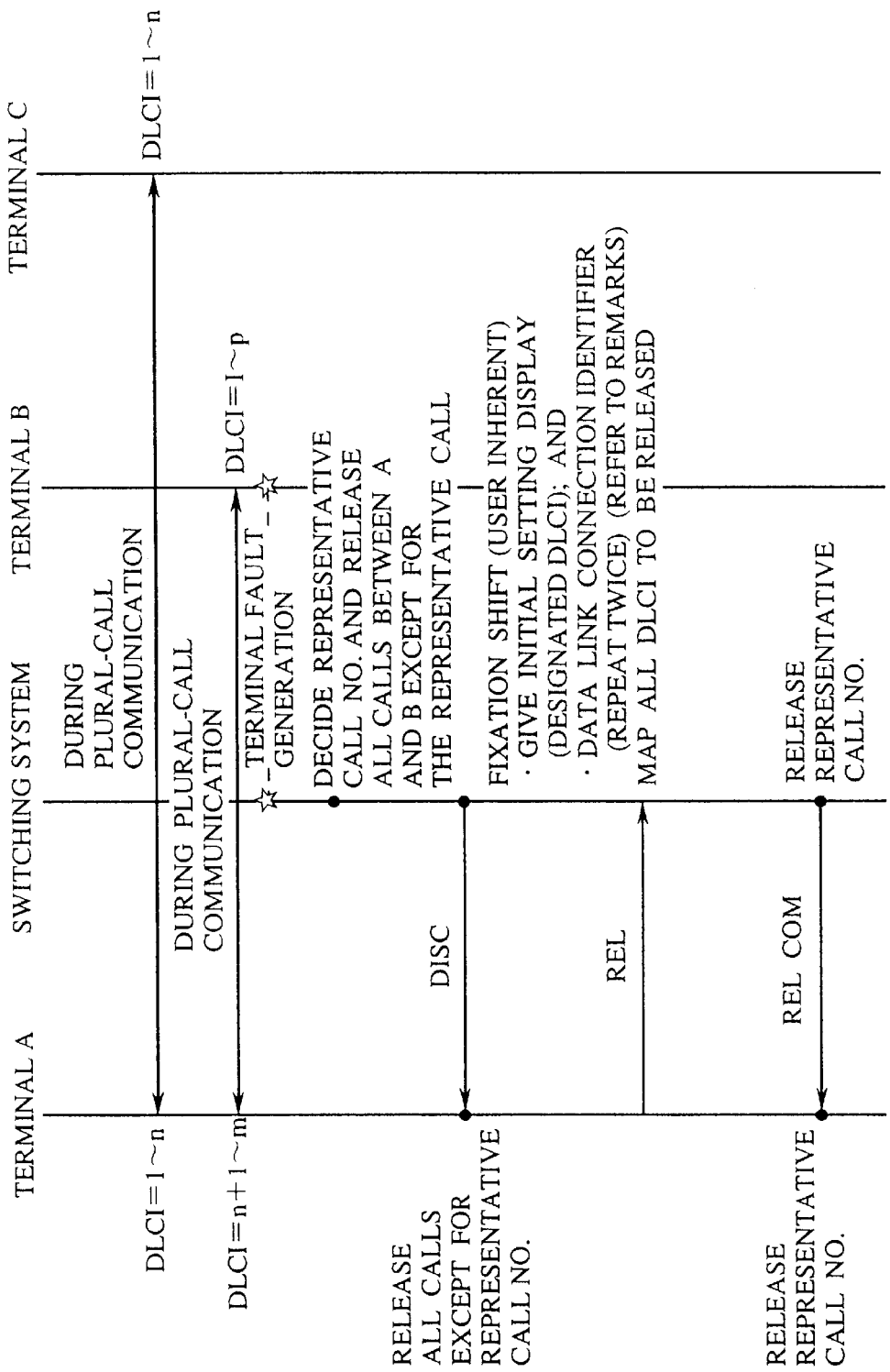
FIG. 20 is a sequential diagram showing yet still another example of the operation of the network system.

FIG. 20 is a sequential diagram showing an operational example when the above-mentioned service (3) is provided between the frame relay exchange FR1 and the terminal unit A. In this operational example, it is assumed that "on-line" is set to the region 113c (123c) in the restart management table 13(23), and in the case where the line control section 11 detects a fault, a part of a plurality of calls set between the frame relay exchange FR1 and the terminal unit A is so set as to be released (cut).

As shown in FIG. 20, it is assumed that when a plurality of calls are set between the terminal units A and B and between the terminal units A and C to conduct data communication, respectively. The terminal unit A uses the first to n-the DLCIs for data communication with the terminal unit C, and the (n+1)-the to m-the DLCIs for data communication with the terminal unit B. In this example, it is assumed that a fault occurs in the terminal unit B.

The line control section 11 of the frame relay exchange FR1 detects a fault of the terminal unit B (step S201), and recognizes that all the calls related to the terminal unit B should be cut among the calls set between the frame relay exchange FR1 and the terminal unit A.

Then, the restart section 12 obtains start No. "n+1" and end No. "m" of DLCIs used between the terminal unit A and the terminal unit B, and decides the smallest No. of the DLCI Nos. thus obtained as the representative call No. (step S204).

Sequentially, the restart section 12 notifies the resource management section 18 and the call control section 14 of the representative call No., a range of the DLCIs to be released and the fact that restart is generated. As a result, the resource management section 18 releases all the DLCIs except for the DLCI (No. "n+1") relating to the representative call No. among the DLCIs used between the terminal unit A and the frame relay exchange Fr1 and also used for data communication between the terminal units A and B (step S206). The DLCIs to be released in this situation include all the DLCIs corresponding to DLCI Nos. (n+1) to m which are set between the frame relay exchange FR1 and the terminal unit B. Also, the call control section 14 gives the transmission request of "DISC", which is an existing release message to the terminal unit A, to the message edition section 16.

The message edition section 17 edits "DISC" of the call of the representative call No. (Step S211). In this time, since the restart service is set to the service (3), the message edition section 17 gives (initial set class=0) to "DISC" using a fixation shift procedure. Subsequently, information on the start No. "n+1" and information on the end No. "m" of the DLCIs to be released is given to "DISC" using the data link connection identifier information element of JT-Q.931. That is, "n+1" is set to the first data link connection identifier information element, and "m" is set to the second data link connection identifier information element. Further, information that restart is generated is given to "DISC". The "DISC" which has been edited is transmitted to the terminal unit A (step S213).

Upon receiving "DISC", the message analysis section 26 of the terminal unit A extracts the information that restart is generated from the "DISC" and gives the information to the restart section 22. The restart section 22 uses the call No. used for transmission of "DISC" as a representative call No. (step S302), and obtains the start No. "n+1" and the end No. "m" of the DLCIs to be released from "DISC", to notify the resource management section 28 of those Nos. and the fact that resource is generated.

The resource management section 28 releases the DLCIs (Nos. (n+1) to m) used between the terminal units A and the frame relay exchange FR1 except for the DLCI relating to the representative call No. (n+1) (step S304). The subsequent operation is identical with that of the first operational example of the service (1), and therefore its description will be omitted. Finally, only the calls set between the terminal units A and B are released.

First Operational Example of Service (4)

Figure 21:
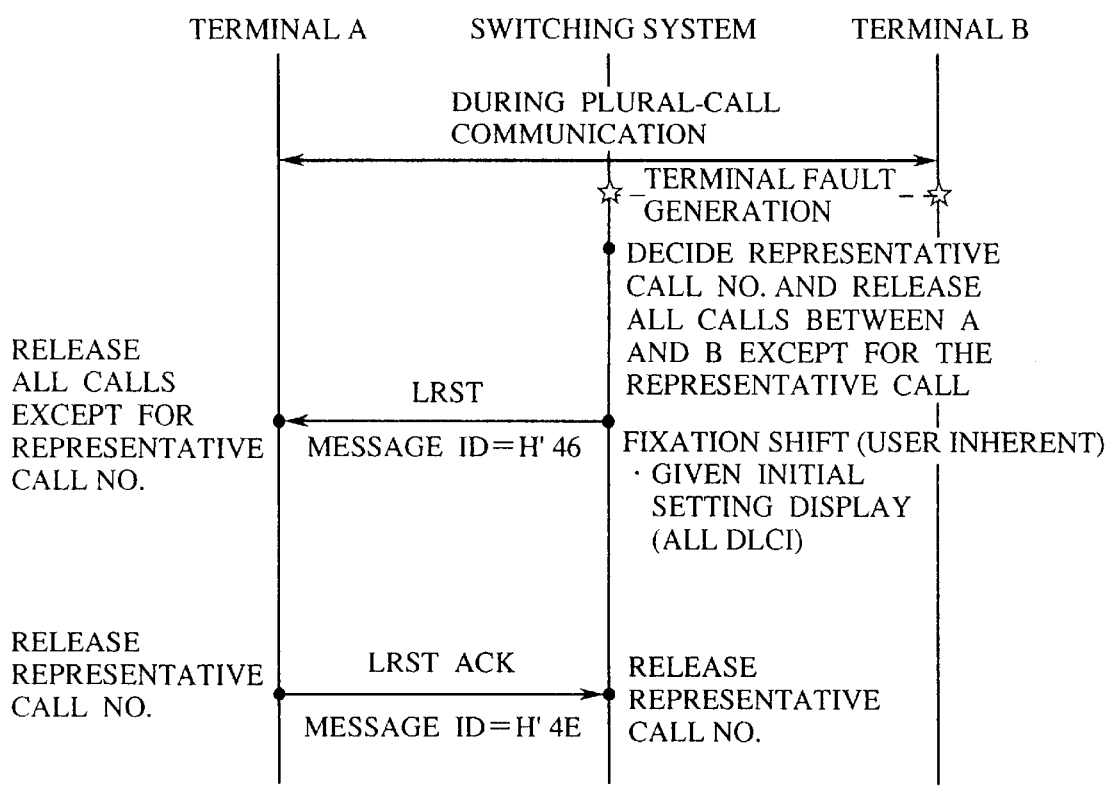
FIG. 21 is a sequential diagram showing yet still another example of the operation of the network system.

FIG. 21 is a sequential diagram showing a first operational example when the above-mentioned service (4) is provided between the frame relay exchange FR1 and the terminal unit A. In this operational example, it is assumed that "on-line" is set to the region 113e(123e) in the restart management table 13(23), and in the case where the line control section 11 detects a fault, all of the calls set between the frame relay exchange FR1 and the terminal unit A is so set as to be released (cut).

Since the operational example shown in FIG. 21 is substantially identical with the operational example shown in FIG. 17, only a difference therebetween will be described. In this operational example, the call control section 14 transmits "LRST" which is a call release message individually set outside of an advice to the terminal unit A. The initial set display information element and information that restart is generated as in the operational example of the service (1) are given to the "LRST".

Upon receiving "LRST", the terminal unit A transmits "LRST ACK" individually set as the response message to the frame relay exchange FR1. Then, in the frame relay exchange FR1, when "LRST ACK" is received, the call and DLCI relating to the representative call No. are released so that "LRST ACK" is abandoned.

Second Operational Example of Service (4)

Figure 22:
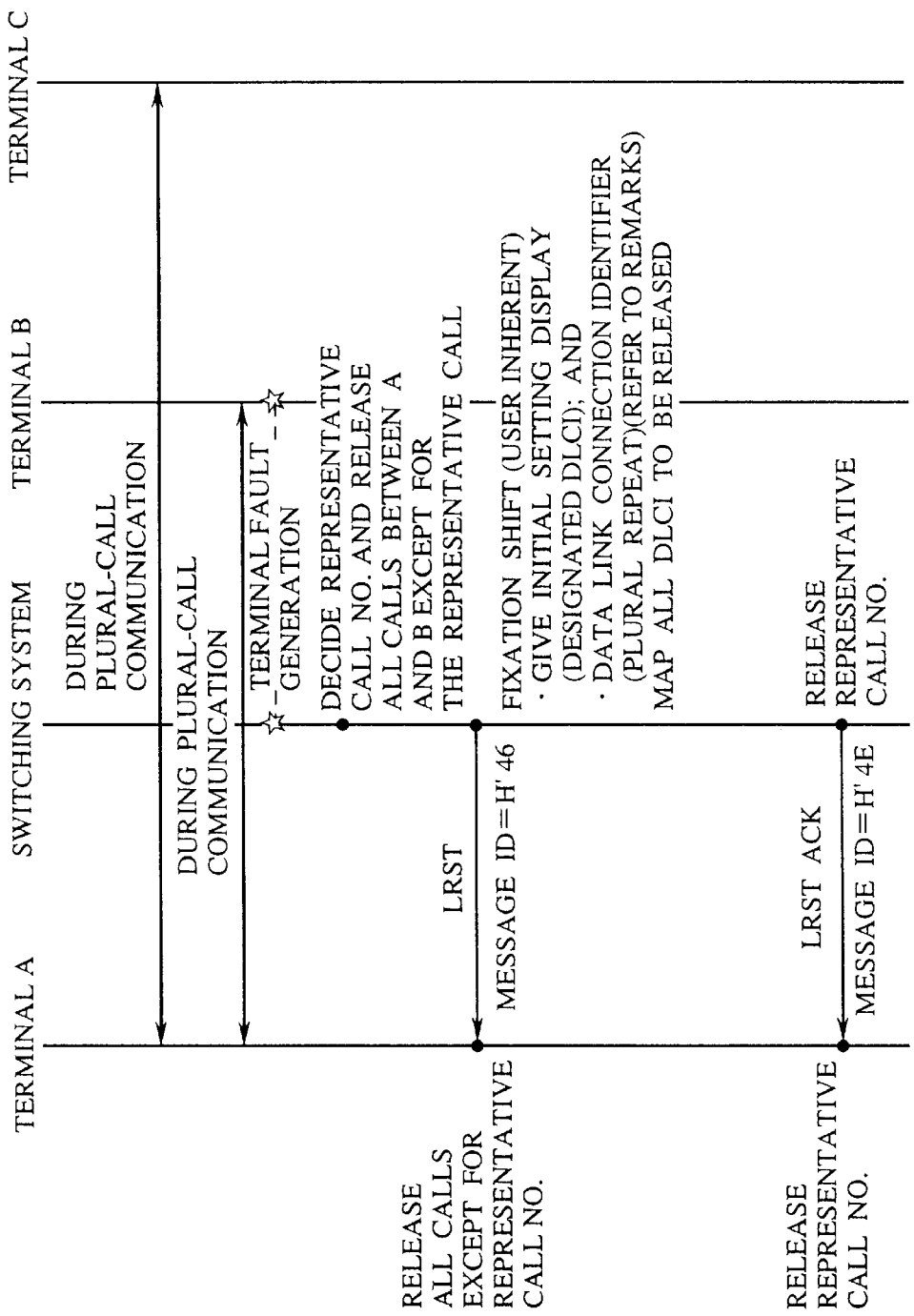
FIG. 22 is a sequential diagram showing yet still another example of the operation of the network system.

FIG. 22 is a sequential diagram showing a second operational example when the above-mentioned service (4) is provided between the frame relay exchange FR1 and the terminal unit A. In this operational example, it is assumed that "on-line" is set to the region 113e(123e) in the restart management table 13(23).

The operational example shown in FIG. 22 is substantially identical with the operation example shown in FIG. 18 except that the messages transmitted and received between the terminal unit A and the frame relay exchange FR1 are "LRST" and "LRST ACK", and therefore its description will be omitted.

Operational Example of Service (5)

Figure 23:
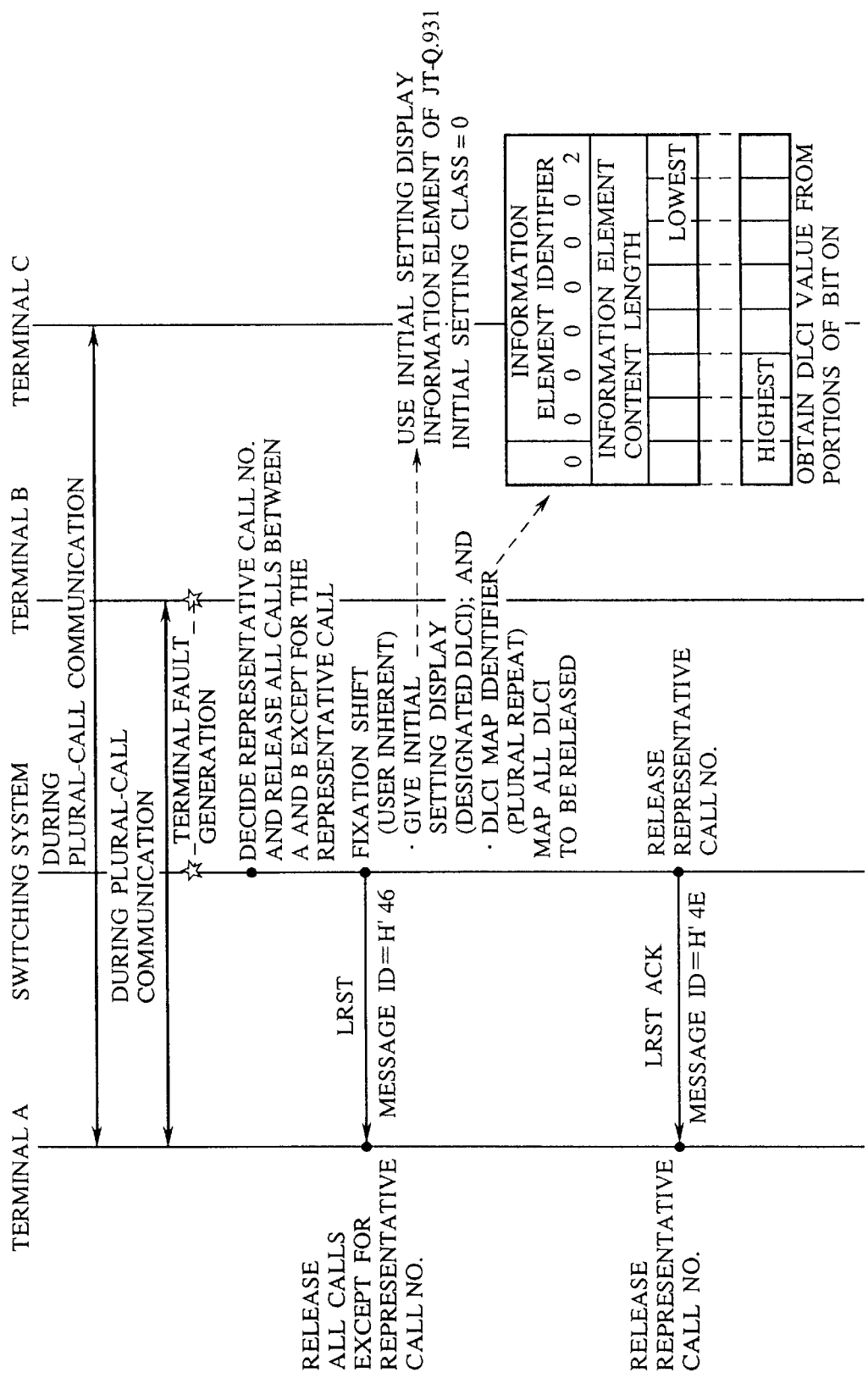
FIG. 23 is a sequential diagram showing yet still another example of the operation of the network system.

FIG. 23 is a sequential diagram showing an operational example when the above-mentioned service (5) is provided between the frame relay exchange FR1 and the terminal unit A. In this operational example, it is assumed that "on-line" is set to the region 113f(123f) in the restart management table 13(23).

The operational example shown in FIG. 23 is substantially identical with the operation example shown in FIG. 19 except that the messages transmitted and received between the terminal unit A and the frame relay exchange FR1 are "LRST" and "LRST ACK", and therefore its description will be omitted.

Operational Example of Service (6)

Figure 24:
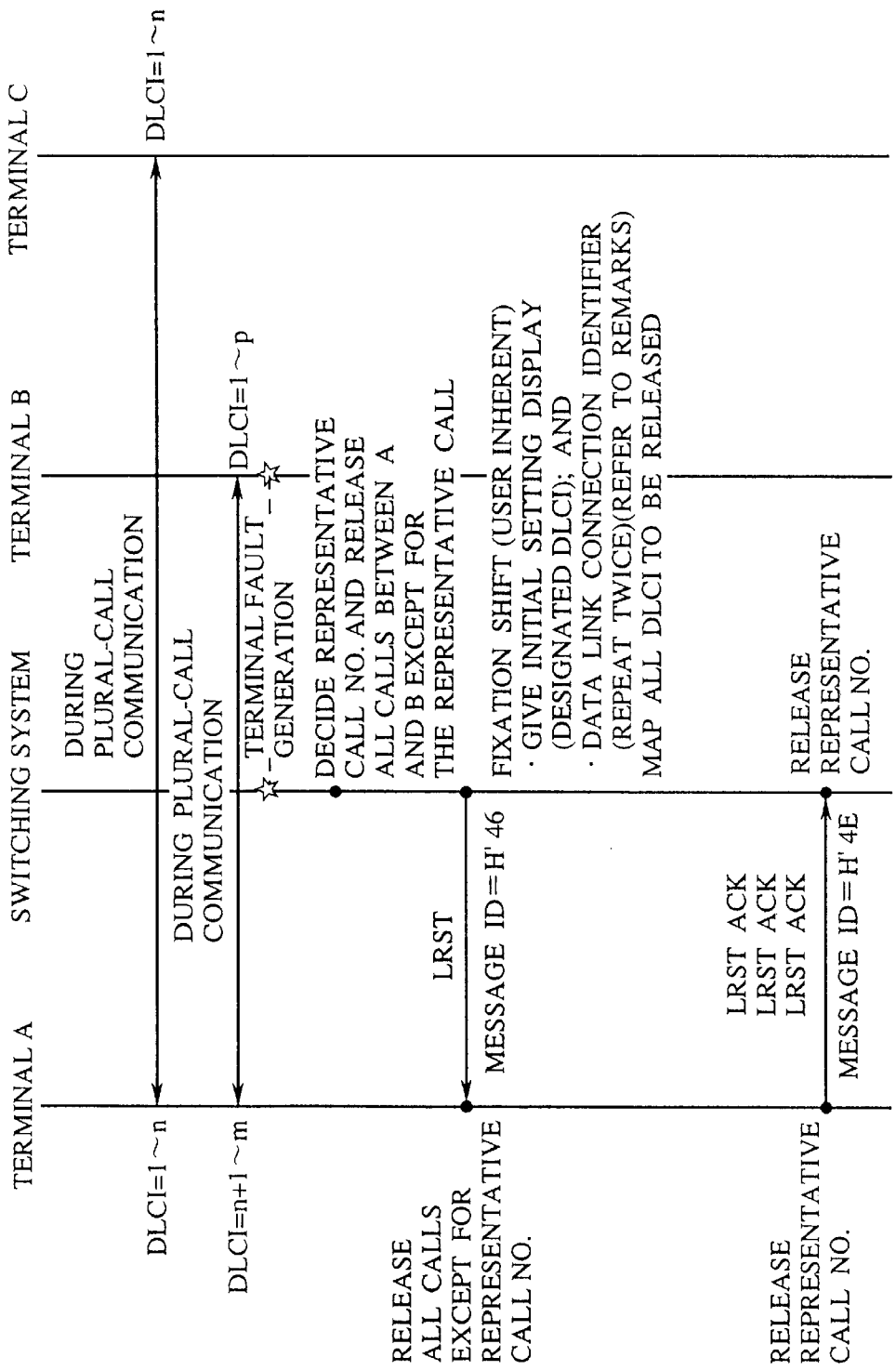
FIG. 24 is a sequential diagram showing yet still another example of the operation of the network system.
Figure 25:
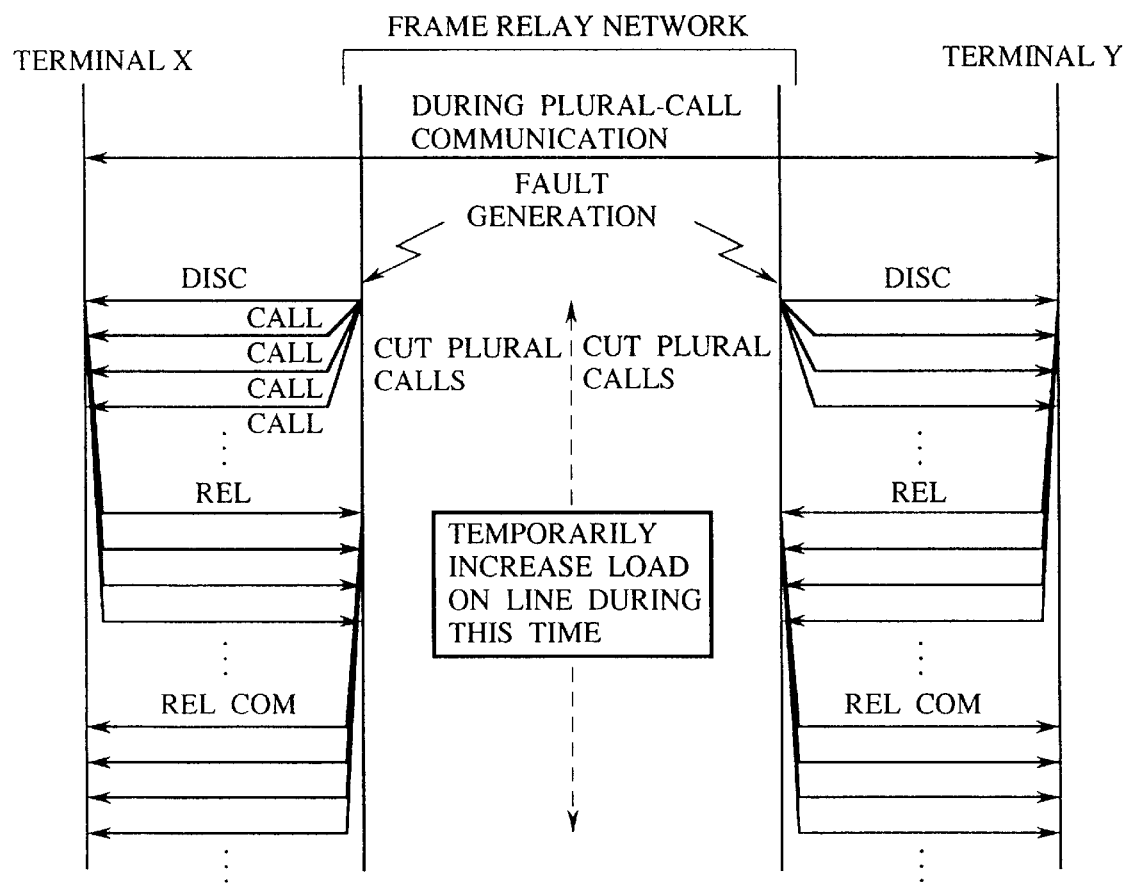
FIG. 25 is a diagram for explaining a problem with a conventional system.

FIG. 24 is a sequential diagram showing an operational example when the above-mentioned service (6) is provided between the frame relay exchange FR1 and the terminal unit A. In this operational example, it is assumed that "on-line" is set to the region 113g(123g) in the restart management table 13(23).

The operational example shown in FIG. 24 is substantially identical with the operation example shown in FIG. 20 except that the messages transmitted and received between the terminal unit A and the frame relay exchange FR1 are "LRST" and "LRST ACK", and therefore its description will be omitted.

As was described above, according to the network system of the present invention, in the case where a line is first opened between the frame relay network FRN (frame relay exchange FR1) and the terminal units A to D, the restart service deciding process is conducted between the terminal unit and the frame relay exchange FR1, to decide the restart service (any one of the services (1) to (6)) provided when the restart is generated.

Then, in conducting data communication between the respective terminal units A to D, in the case where a fault occurs in any one of the terminal units A to D, the frame relay exchange Fr1, or a communication line, the restart process is executed on any one of the services (1) to (6) determined by the restart service deciding process, between the terminal unit and the frame relay exchange FR1.

According to the restart process, the cutting procedure of cutting the call relating to the representative call No. is conducted so that a plurality of calls and DLCIs are released. For that reason, the restart procedure can be completed earlier than the prior art. Also, a load on the line which is caused by conducting the procedure of cutting a plurality of calls as in the prior art can be reduced. Therefore, a deterioration of the through-put which is caused by an increased load on the line can be prevented, and a response in data communication between the respective terminal units can be prevented from lowering.

Also, since the restart service deciding process is executed only at the time of first opening the line, a troublesomeness that the deciding process is conducted every time the call setting request is received by the frame relay exchange FR1 can be prevented.

Further, the frame relay exchange FR1 according to this embodiment can connect even a terminal unit that does not provide the restart service. In this case, however, the same restart procedure as conventional one is carried out.

As was described above, according to the present invention, in the case where there is the necessity of cutting all of calls in a point-to-point logic link or cutting a plurality of calls at the same time in the frame relay SVC, they can be cut without increasing a load on the line, with the result that the generation of congestion can be suppressed. For that reason, the data transfer of PVC (inter-fixation connection) of the same line lock or SVC not to be cut is not adversely affected. They greatly contributes to an improvement in performance of the frame relay line.

Also, with the function of automatically discriminating the restart procedure (restart service), a connection between a communication system to which the present invention is applied and a communication system to which the present invention is not applied can be conducted, and it is unnecessary that a maintenance man gives an attention to this.

In this embodiment, the representative call No. is decided by the smallest No., but the largest call no. may be decided as the representative call No. Alternatively, the representative call No. may be decided from a plurality of calls at random.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A network system comprising a network and a plurality of terminals connected to the network:

wherein the network comprises:

call setting request means for transmitting a call setting request message to a specific terminal among the plurality of terminals;

information adding means for adding procedure information relating to a restart procedure executable between the network and the specific terminal to the call setting request message;

extracting means for extracting specific information relating to the restart procedure contained a response message received from the specific terminal;

first procedure setting means for setting a restart procedure corresponding to the specific information extracted by the extracting means to be executable between the network and the specific terminal; and wherein the specific terminal comprises:

receiving means for receiving the call setting request message transmitted from the network;

information obtaining means for obtaining the procedure information contained the call setting request message received by the receiving means;

information holding means for holding information relating to a plurality of restart procedures executable between the specific terminal and the network;

information producing means for producing the specific information relating to the restart procedure executable between the specific terminal and the network on the basis of the information held by the information holding means and the information obtained by the information obtaining means;

response means for transmitting the response message in which the specific information produced by the information producing means is contained to the network; and second procedure setting means for setting the restart procedure corresponding to the specific information produced by the information producing means to be executable between the specific terminal and the network.

2. A network system as claimed in claim 1, wherein the specific terminal further comprises:

second call setting request means for transmitting a call setting request message to the network;

second information adding means for adding procedure information relating to a restart procedure executable between the network and the specific terminal to the call setting request message; and second extracting means for extracting specific information relating to the restart procedure contained in a response message received from the network;

wherein the second procedure setting means set a restart procedure corresponding to the specific information extracted by the second extracting means to be executable between the frame relay network and the specific terminal;

wherein the network further comprises:

second receiving means for receiving the call setting request message transmitted from the specific terminal; second information obtaining means for obtaining the information relating to the restart procedure contained in the call setting request message received by the second receiving means;

second information holding means for holding information relating to a restart procedure executable between the specific terminal and the network;

second information producing means for producing the specific information relating to the restart procedure executable between the specific terminal and the network on the basis of the information held by the second procedure information holding means and the information obtained by the second information obtaining means;

second response means for transmitting the response message in which the specific information produced by the second information producing means is contained to the specific terminal; and wherein the first procedure setting means set the restart procedure corresponding to the specific information produced by the second information producing means to be executable between the specific terminal and the network.

3. A network system as claimed in claim 1, wherein the information adding means of the network only add the procedure information to the call setting request message, when the call setting request means first transitting the call setting request message to the specific terminal.

4. A network system according to claim 2, wherein the second information adding means of the specific terminal only add the procedure information to the call setting request message, when the second call setting request means first transitting the call setting request message to the network.

5. A network system comprising a network and a plurality of terminals connected to the network, wherein the network comprises:

fault detecting means for detecting, when a plurality of calls for communication are set between one terminal and the other terminal among the plurality of terminals via the network, a fault in the communication;

representative call deciding means for deciding any one of the plurality of calls as a representative call, when the fault detecting means detecting the fault of the communication;

first releasing means for releasing the plurality of calls set between the one termnal and the other terminal except for the representative call;

call cut message transmitting means for producing a call cut message for releasing the representative call and transmitting the call cut message to the one terminal;

call information adding means for adding call information about calls to be released to the call cut message; and second releasing means for releasing the representative call set between the one terminal and the network and transmitting a call release completion message corresponding to the call release message to the one terminal in the case of receiving a call release message corresponding to the call cut message from the one terminal; and wherein the one terminal comprises:

third releasing means for releasing the plurality of calls set between the one terminal and the network except for the representative call on the basis of the call information contained in the call cut message received from the network;

call release message transmitting means for producing the call release message and transmitting the call release message to the network; and fourth releasing means for releasing the representative call set between the one terminal and the network in the case of receiving the call release completion message.

6. A network system according to claim 5, wherein the call information contains data link connection identification numbers to be released.

7. A network system according to claim 5, wherein the call information contains a bit map indicating data link connection identification numbers to be released.

8. A network system according to claim 5, wherein the call information contains range of data link connection identification numbers to be released.

9. A network system comprising a network and a plurality of terminals connected to the network, wherein the network comprises:

fault detecting means for detecting, when a plurality of calls for communication are set between a first terminal, a second terminal and a third terminal among the plurality of terminals via the network, a fault in the communication of the first terminal and the second terminal;

representative call deciding means for deciding any one of the plurality of calls set between the first terminal and the second terminal as a representative call when the fault of the communication between the first terminal and the second terminal is detected by the fault detecting means;

first releasing means for releasing the plurality of calls set between the first terminal and the second terminal except for the representative call;

call cut message transmitting means for producing a call cut message for relating the representative call and transmitting the call cut message to the first terminal;

call information adding means for adding call information about calls to be released to the call cut message; and second releasing means for releasing the representative call set between the first terminal and the network and transmitting a call release completion message corresponding to a call release message to the first terminal in the case of receiving the call release message corresponding to the call cut message from the first terminal; and wherein the one terminal comprises:

third releasing means for releasing the plurality of calls set between the first terminal and the network except for the representative call on the basis of the call information is contained in the call cut message received from the network;

call release message transmitting means for producing the call release message and transmitting the call release message to the network; and fourth releasing means for releasing the representative call in the case of receiving the call release completion message.

10. A network system comprising a network and a plurality of terminal connected to the network:

wherein the network comprises:

fault detecting means for detecting, when a plurality of calls for communication are set between one terminal and the other terminal among the plurality of terminals via the network, a fault in the communication;

representative call deciding means for deciding any one of the plurality of calls as a representative call, when the fault detecting means detecting the fault of the communication;

first releasing means for releasing the plurality of calls set between the one termnal and the other terminal except for the representative call;

call cut message transmitting means for producing a call cut message for releasing the representative call and transmitting the call cut message to the one terminal;

call information adding means for adding call information about calls to be released to the call cut message; and second releasing means for releasing the representative call set between the one terminal and the network in the case of receiving a response message corresponding to the call cut message from the one terminal; and wherein the one terminal comprises:

third releasing means for releasing all of the plurality of calls set between the one terminal and the network on the basis of the call cut message received from the network; and response message transmitting means for producing the response message and transmitting the response message to the network.

11. A network system comprising a network and a plurality of terminals connected to the network, wherein the network comprises:

fault detecting means for detecting, when a plurality of calls for communication are set between a first terminal, a second terminal and a third terminal among the plurality of terminals via the network, a fault in the communication of the first terminal and the second terminal;

representative call deciding means for deciding any one of the plurality of calls set between the first terminal and the second terminal as a representative call when the fault of the communication between the first terminal and the second terminal is detected by the fault detecting means;

first releasing means for releasing the plurality of calls set between the first terminal and the second terminal except for the representative call;

call cut message transmitting means for producing a call cut message for relating the representative call and transmitting the call cut message to the first terminal;

call information adding means for adding call information about calls to be released to the call cut message; and second releasing means for releasing the representative call set between the first terminal and the network and in the case of receiving a response message corresponding to the call cut message from the first terminal; and wherein the first terminal comprising:

third releasing means for releasing all of the plurality of calls set between the first terminal and the network on the basis of the call cut message received from the network; and response message transmitting means for producing the response message and transmitting the response message to the network.

12. A network system comprising a network and a plurality of terminal connected to the network:

wherein the network comprises:

fault detecting means for detecting, when a plurality of calls for communication are set between one terminal and the other terminal among the plurality of terminals via the network, a fault in the communication;

representative call deciding means for deciding any one of a part of the plurality of calls as a representative call, when the fault detecting means detecting the fault of the communication;

first releasing means for releasing the part of the plurality of calls set between the one termnal and the other terminal except for the representative call;

call cut message transmitting means for producing a call cut message for releasing the representative call and transmitting the call cut message to the one terminal;

call information adding means for adding call information about calls to be released to the call cut message; and second releasing means for releasing the representative call set between the one terminal and the network in the case of receiving a response message corresponding to the call cut message from the one terminal; and wherein the one terminal comprises:

third releasing means for releasing all of the part of the plurality of calls set between the one terminal and the network on the basis of the call cut message received from the network; and response message transmitting means for producing the response message and transmitting the response message to the network.

* * * * *